(12) United States Patent
Ijuin et al.

(10) Patent No.: US 10,651,433 B2
(45) Date of Patent: *May 12, 2020

(54) PACKAGING MATERIAL FOR POWER STORAGE DEVICE, AND METHOD OF PRODUCING PACKAGING MATERIAL FOR POWER STORAGE DEVICE

(71) Applicant: TOPPAN PRINTING CO., LTD., Tokyo (JP)

(72) Inventors: Wataru Ijuin, Tokyo (JP); Satoshi Sasaki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 118 days.

This patent is subject to a terminal disclaimer.

(21) Appl. No.: 15/922,417

(22) Filed: Mar. 15, 2018

(65) Prior Publication Data

US 2018/0219192 A1 Aug. 2, 2018

Related U.S. Application Data

(63) Continuation of application No. PCT/JP2016/077096, filed on Sep. 14, 2016.

(30) Foreign Application Priority Data

Sep. 16, 2015 (JP) .................................. 2015-182662
Nov. 9, 2015 (JP) .................................. 2015-219448
(Continued)

(51) Int. Cl.
*B32B 27/36* (2006.01)
*H01M 2/02* (2006.01)
(Continued)

(52) U.S. Cl.
CPC .............. *H01M 2/0287* (2013.01); *B32B 7/12* (2013.01); *B32B 15/00* (2013.01); *B32B 15/085* (2013.01);
(Continued)

(58) Field of Classification Search
CPC ....... B32B 15/00; B32B 15/085; B32B 15/09; B32B 15/20; B32B 2255/06;
(Continued)

(56) References Cited

U.S. PATENT DOCUMENTS

2013/0295377 A1 11/2013 Manabe et al.
2016/0308174 A1 10/2016 Takahai et al.
2016/0365545 A1 12/2016 Takahagi et al.

FOREIGN PATENT DOCUMENTS

EP          2 657 003 A1    10/2013
JP          2013-006412      1/2013
(Continued)

OTHER PUBLICATIONS

Extended European Search Report dated Sep. 20, 2018 in corresponding application No. 16846505.2.
(Continued)

*Primary Examiner* — Lawrence D Ferguson
(74) *Attorney, Agent, or Firm* — Foley & Lardner LLP

(57) ABSTRACT

A packaging material for a power storage device having a structure including at least a substrate layer, an adhesive layer, a metal foil layer, a sealant adhesive layer, and a sealant layer laminated in this order. In the packaging material, the substrate layer is formed of a polyester film having a 50% elongation stress in the range of 100 to 180 MPa and a thermal shrinkage in the range of 1 to 15%, after heat treatment from 160° C. to 200° C., or a polyester film having a difference ΔA in break elongation of 12% or more after heat treatment at 200° C. and 160° C. and having a 50%
(Continued)

elongation stress of 75 MPa or more after heat treatment at 200° C.

12 Claims, 3 Drawing Sheets

(30) Foreign Application Priority Data

| Apr. 12, 2016 | (JP) | ................................. 2016-079560 |
| Jul. 25, 2016 | (JP) | ................................. 2016-145508 |

(51) Int. Cl.

| H01G 11/78 | (2013.01) |
|---|---|
| B32B 15/00 | (2006.01) |
| H01G 11/82 | (2013.01) |
| B32B 7/12 | (2006.01) |
| B32B 15/085 | (2006.01) |
| B32B 15/09 | (2006.01) |
| B32B 15/20 | (2006.01) |
| B32B 27/08 | (2006.01) |
| B32B 27/16 | (2006.01) |
| B32B 27/32 | (2006.01) |
| B32B 37/02 | (2006.01) |
| B32B 37/06 | (2006.01) |
| B32B 37/10 | (2006.01) |
| B32B 37/12 | (2006.01) |
| B32B 37/15 | (2006.01) |
| B32B 38/00 | (2006.01) |
| H01G 11/84 | (2013.01) |
| H01M 10/0525 | (2010.01) |

(52) U.S. Cl.
CPC .............. *B32B 15/09* (2013.01); *B32B 15/20* (2013.01); *B32B 27/08* (2013.01); *B32B 27/16* (2013.01); *B32B 27/32* (2013.01); *B32B 27/36* (2013.01); *B32B 37/02* (2013.01); *B32B 37/06* (2013.01); *B32B 37/10* (2013.01); *B32B 37/1207* (2013.01); *B32B 37/153* (2013.01); *B32B 38/0008* (2013.01); *H01G 11/78* (2013.01); *H01G 11/82* (2013.01); *H01G 11/84* (2013.01); *H01M 2/0202* (2013.01); *H01M 2/028* (2013.01); *H01M 2/0277* (2013.01); *H01M 2/0285* (2013.01); *H01M 10/0525* (2013.01); *B32B 2255/06* (2013.01); *B32B 2255/10* (2013.01); *B32B 2255/20* (2013.01); *B32B 2255/26* (2013.01); *B32B 2307/732* (2013.01); *B32B 2310/14* (2013.01); *B32B 2311/24* (2013.01); *B32B 2323/10* (2013.01); *B32B 2333/00* (2013.01); *B32B 2367/00* (2013.01); *B32B 2457/10* (2013.01); *B32B 2457/16* (2013.01); *H01M 2/026* (2013.01); *H01M 2002/0297* (2013.01); *H01M 2220/30* (2013.01); *Y02E 60/13* (2013.01)

(58) Field of Classification Search
CPC ............ B32B 2255/10; B32B 2255/20; B32B 2255/26; B32B 2307/732; B32B 2310/14; B32B 2311/24; B32B 2323/10; B32B 2333/00; B32B 2367/00; B32B 2457/10; B32B 2457/16; B32B 27/08; B32B 27/16; B32B 27/32; B32B 27/36; B32B 37/02; B32B 37/06; B32B 37/10; B32B 37/1207; B32B 37/153; B32B 38/0008; B32B 7/12; H01G 11/78; H01G 11/82; H01G 11/84; H01M 10/0525; H01M 2002/0297; H01M 2220/30; H01M 2/0202; H01M 2/026; H01M 2/0277; H01M 2/028; H01M 2/0285; H01M 2/0287; Y02E 60/13
See application file for complete search history.

(56) References Cited

FOREIGN PATENT DOCUMENTS

| JP | 2013-101765 A | 5/2013 |
| JP | 2014-022080 A | 2/2014 |
| JP | 2015-095366 | 5/2015 |
| WO | WO-2012/086501 A1 | 6/2012 |
| WO | WO-2015/087901 | 6/2015 |
| WO | WO-2015/125806 A1 | 8/2015 |

OTHER PUBLICATIONS

International Search Report with English Translation and Written Opinion issued in International Application No. PCT/JP2016/077096 dated Dec. 6, 2016.

Japanese Office Action dated Oct. 8, 2019 for corresponding Application No. 2015-182662.

Japanese Office Action dated Dec. 3, 2019 for corresponding Application No. 2015-219448.

ABSTRACT
PACKAGING MATERIAL FOR POWER STORAGE DEVICE, AND METHOD OF PRODUCING PACKAGING MATERIAL FOR POWER STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/077096, filed on Sep. 14, 2016, which is based upon and claims the benefit of priority to Japan Priority Application No. 2015-182662, filed on Sep. 16, 2015; Japan Priority Application No. 2015-219448, filed on Nov. 9, 2015; Japan Priority Application No. 2016-079560, filed on Apr. 12, 2016; Japan Priority Application No. 2016-145508, filed on Jul. 25, 2016; the disclosures of which are all hereby incorporated herein by reference in their entireties.

TECHNICAL FIELD

The present invention relates to a packaging material for a power storage device and a method of producing a packaging material for a power storage device.

BACKGROUND ART

Power storage devices are known to include secondary batteries, such as lithium ion batteries, nickel hydride batteries, and lead batteries, and electrochemical capacitors, such as electric double layer capacitors. Due to miniaturization of mobile devices, limitation of installation spaces, or the like, further miniaturization of power storage devices is sought, and thus attention is given to lithium ion batteries for their high energy density. Packaging materials for lithium ion batteries have conventionally been metal cans, however; multilayer films are increasingly used because they are lightweight, highly heat dissipating, and produced at low cost.

Such a lithium ion battery using the multilayer film as a packaging material uses a configuration in which battery contents (e.g., cathode, separator, anode, electrolyte solution) are covered with a packaging material including an aluminum foil layer to thereby prevent moisture from penetrating into the battery. A lithium ion battery using such a configuration is referred to as an aluminum laminated lithium ion battery.

Embossed lithium ion batteries, for example, are known as aluminum laminated lithium ion batteries. In such an embossed lithium ion battery, a recessed portion is formed at part of the packaging material by cold forming, battery contents are stored in the recessed portion, and the rest of the packaging material is folded back, followed by heat sealing the edge portions (e.g., see PTL 1). With such a lithium ion battery, a recess formed deeper by cold forming enables storage of more battery contents to achieve higher energy density.

CITATION LIST

Patent Literature

[PTL 1] JP 2013-101765 A

SUMMARY OF THE INVENTION

Technical Problem

However, when a packaging material for a power storage device is produced using the material and the production method described in PTL 1 to form a deep recess in the packaging material, the packaging material may sometimes be broken.

The present invention has been made in view of the above circumstances and has an object to provide a packaging material for a power storage device with good deep drawing formability, and a method of producing a packaging material for a power storage device.

Solution to Problem

A first arrangement provides a packaging material for a power storage device including a structure including at least a substrate layer, an adhesive layer, a metal foil layer, a sealant adhesive layer, and a sealant layer laminated in this order.

The substrate layer is formed of a polyester film having a 50% elongation stress in a range of 100 to 180 MPa and a thermal shrinkage in a range of 1% to 15%, after heat treatment in a range of 160° C. to 200° C.

The 50% elongation stress is an average of stresses resulting from tensile tests (test piece shape: dumbbell No. 5 according to JIS K7127; length between chucks: 75 mm; gauge length: 25 mm; test speed: 50 mm/min; temperature: 23° C.) in four directions (0° (MD), 45°, 90° (TD), 135°) of the substrate layer.

The thermal shrinkage is an average of shrinkages before and after heat treatment in four directions (0° (MD), 45°, 90° (TD), 135°) of the substrate layer.

The process of producing a packaging material for a power storage device may entail a lamination step of laminating a plurality of layers. In this step, heat is generated during lamination or when drying the adhesive thermal, possibly deteriorating the substrate layer, which may further lead to breakage thereof when the material is drawn. Even a substrate layer so rigid as almost not causing deterioration due to heat generated during lamination or generated when drying the adhesive may be broken when the material is drawn. Even when the packaging material has excellent drawing properties, processability may be insufficient, such as the metal foil layer and the sealant layer not being appropriately bonded, or the bonded film not being appropriately taken up. This arrangement should help to improve these problems.

Another arrangement is a packaging material for a power storage device comprising a structure including at least a substrate layer, an adhesive layer, a metal foil layer, a sealant adhesive layer, and a sealant layer laminated in this order. The substrate layer is formed of a polyester film having ΔA of 12% or more expressed by Formula (1) below and having a 50% elongation stress of 75 MPa or more after heat treatment at 200° C.

$$\Delta A = \text{(break elongation after 200° C. heat treatment)} - \text{(break elongation after 160° C. heat treatment)} \quad (1)$$

It should be noted that the break elongation and the 50% elongation stress are each an average at 23° C. resulting from tensile tests (test piece shape: dumbbell No. 5 according to JIS K7127, length between chucks: 75 mm, gauge length: 25 mm, test speed: 50 mm/min) in four directions (0° (MD), 45°, 90° (TD), 135°) of the substrate layer.

The process of producing a packaging material for a power storage device may entail a lamination step of laminating a plurality of layers. In this step, heat is generated during lamination or when drying the adhesive thermal, possibly deteriorating the substrate layer, which may further lead to breakage thereof when the material is drawn. Even a substrate layer so rigid as almost not causing deterioration due to heat generated during lamination or generated when drying the adhesive may be broken when the material is drawn. The second arrangement should improve these problems and may exhibit good deep drawing formability regardless of the production process of the packaging material.

In the packaging material for a power storage device, it is preferred that the polyester film has a thermal shrinkage in a range of 1 to 5% after heat treatment at 160° C. This may easily improve processability during production and deep drawing formability after production.

It is preferred that the packaging material for a power storage device further includes an adhesion enhancement layer provided between the substrate layer and the adhesive layer. This may further improve adhesion between the substrate layer and the adhesive layer and may also further improve deep drawing formability.

In the packaging material for a power storage device, it is preferred that the adhesion enhancement layer contains at least one resin selected from the group consisting of a polyester resin, an acrylic resin, a polyurethane resin, an epoxy resin, and an acrylic-grafted polyester resin. This may further improve adhesion between the substrate layer and the adhesive layer and may also further improve deep drawing formability.

It is preferred that the packaging material for a power storage device further includes an anticorrosion treatment layer provided on both surfaces of the metal foil layer. This may further improve adhesion between the substrate layer and the metal foil layer.

In the packaging material for a power storage device, it is preferred that the anticorrosion treatment layer contains a rare earth element oxide, and phosphoric acid or phosphate. This may further improve adhesion between the substrate layer and the metal foil layer.

In the packaging material for a power storage device, it is preferred that the rare earth element oxide is cerium oxide. This may further improve adhesion between the substrate layer and the metal foil layer.

The packaging material for a power storage device may include a structure further including a coating layer laminated on the substrate layer. This may improve adhesion to an acrylic PSA tape.

In the packaging material for a power storage device, it is preferred that the coating layer contains at least one resin selected from the group consisting of an acrylic resin and a polyester resin. This may further improve adhesion to an acrylic PSA tape.

In the packaging material for a power storage device, it is preferred that the coating layer has a thickness in the range of 0.05 to 3 μm. This may easily prevent lowering of drawing properties even when a coating layer is provided.

In the packaging material for a power storage device, it is preferred that a thickness ratio of the substrate layer to the metal foil layer (substrate layer thickness/metal foil layer thickness) is in the range of 0.25 to 1.00. Such a packaging material is capable of exhibiting better deep drawing formability.

The present invention also provides a method of producing a packaging material for a power storage device, including steps of adhering a substrate layer to a surface of a metal foil layer via an adhesive layer, and forming a sealant layer on a surface of the metal foil layer on a side opposite of the adhesive layer via a sealant adhesive layer. The substrate layer is formed of a polyester film having a 50% elongation stress in a range of 100 to 180 MPa and a thermal shrinkage in a range of 1% to 15%, after heat treatment in a range of 160° C. to 200° C.

The 50% elongation stress is an average of stresses resulting from tensile tests (test piece shape: dumbbell No. 5 according to JIS K7127; length between chucks: 75 mm; gauge length: 25 mm; test speed: 50 mm/min; temperature: 23° C.) in four directions (0° (MD), 45°, 90° (TD), 135°) of the substrate layer.

The thermal shrinkage is an average of shrinkages before and after heat treatment in four directions (0° (MD), 45°, 90° (TD), 135°) of the substrate layer.

The present invention further provides a method of producing a packaging material for a power storage device, including steps of adhering a substrate layer to a surface of a metal foil layer via an adhesive layer, and forming a sealant layer on a surface of the metal foil layer on a side opposite of the adhesive layer via a sealant adhesive layer. The substrate layer is formed of a polyester film having $\Delta A$ of 12% or more expressed by Formula (1) below and having a 50% elongation stress of 75 MPa or more after heat treatment at 200° C.:

$$\Delta A = \text{(break elongation after 200° C. heat treatment)} - \text{(break elongation after 160° C. heat treatment)} \quad (1)$$

It should be noted that the break elongation and the 50% elongation stress are each an average at 23° C. resulting from tensile tests (test piece shape: dumbbell No. 5 according to JIS K7127, length between chucks: 75 mm, gauge length: 25 mm, test speed: 50 mm/min) in four directions (0° (MD), 45°, 90° (TD), 135°) of the substrate layer.

Advantageous Effects of the Invention

The present invention provides a packaging material for a power storage device with good deep drawing formability, and a method of producing a packaging material for a power storage device.

DESCRIPTION OF THE REPRESENTATIVE EMBODIMENTS

Figure 1:
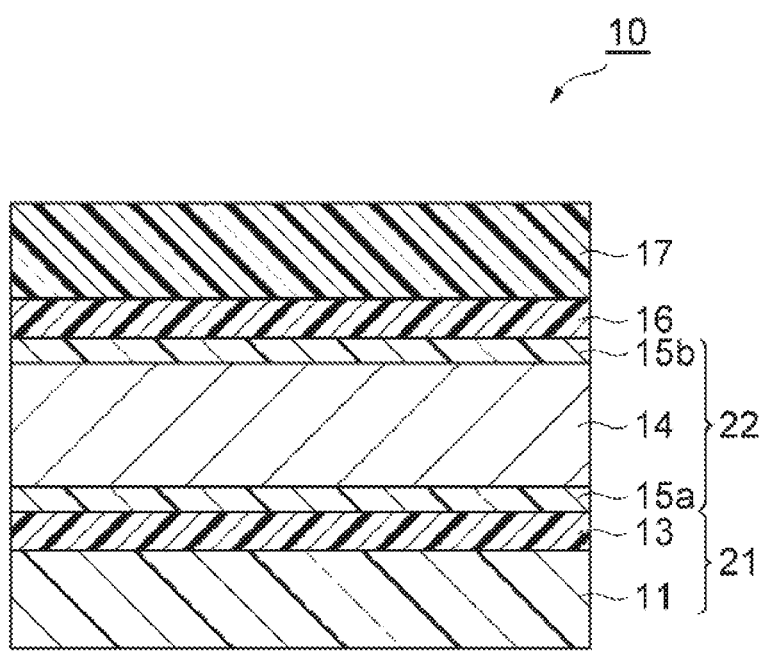
FIG. 1 is a schematic cross-sectional view illustrating a power storage device packaging material, according to an embodiment of the present invention.

With reference to the drawings, preferred embodiments of the present invention will be described in detail. In the drawings, the same or corresponding parts are denoted by the same reference signs to omit duplicate description. However, it will be understood that the embodiments described below are representative of the present invention and that the present invention is not limited to these embodiments.

First Embodiment

[Packaging Material for Power Storage Device]

FIG. 1 is a schematic cross-sectional view illustrating an embodiment of a packaging material for a power storage device of the present invention. As illustrated in FIG. 1, a packaging material (packaging material for power storage device) 10 of the present embodiment is a laminate sequentially laminated with a substrate layer 11, an adhesion enhancement layer 12 provided to a surface of the substrate layer 11, an adhesive layer 13 provided to the adhesion enhancement layer 12 on a side facing the substrate layer 11, a metal foil layer 14 provided to the adhesive layer 13 on a side facing the adhesion enhancement layer 12 and having anticorrosion treatment layers 15a and 15b on opposing surfaces thereof, a sealant adhesive layer 16 provided to the metal foil layer 14 on a side opposite of the adhesive layer 13, and a sealant layer 17 provided to the sealant adhesive layer 16 on a side opposite of the metal foil layer 14. The anticorrosion treatment layer 15a is provided to an adhesive layer 13 side surface of the metal foil layer 14 and the anticorrosion treatment layer 15b is provided to a sealant adhesive layer 16 side surface of the metal foil layer 14. The packaging material 10 may further include a coating layer 18 that is provided to the substrate layer 11 on a side opposite to the adhesion enhancement layer 12. In the packaging material 10, the substrate layer 11 (or the coating layer 18) is the outermost layer and the sealant layer 17 is the innermost layer. That is, the packaging material 10 is used, with the substrate layer 11 being on the outside of the power storage device and the sealant layer 17 being on the inside of the power storage device.

(Substrate Layer 11)

The substrate layer 11 imparts heat resistance and electrolyte resistance to the packaging material 10 to suppress possible occurrence of pinholes therein during processing or distribution. The heat resistance is effective in the pressure heat-sealing step, described later, that is performed during production of the power storage device. The electrolyte resistance is effective against electrolyte leakage from other power storage devices.

The substrate layer 11 is made of a polyester film described below and has a stress value of 100 to 180 MPa and a thermal shrinkage of 1% to 15% at 50% elongation following 160° C. to 200° C. heat treatment.

50% elongation stress: An average of stress values resulting from tensile tests (test piece shape: dumbbell No. 5 according to JIS K7127, length between chucks: 75 mm, gauge length: 25 mm, test speed: 50 mm/min, temperature: 23° C.) in four directions (0° (MD), 45°, 90° (TD), 135°) of the substrate layer.

Thermal shrinkage: an average of shrinkages before and after heat treatment in four directions (0° (MD), 45°, 90° (TD), 135°) of the substrate layer.

The 50% elongation stress (F50 stress value) of the substrate layer 11 can be specifically measured as follows. That is, a substrate layer cut into an A4 size is heated for 30 minutes in an oven kept at a selected heat treatment temperature in the range of 160° C. to 200° C. After that, tensile tests (test piece shape: dumbbell No. 5 according to JIS K7127, length between chucks: 75 mm, gauge length: 25 mm, test speed: 50 mm/min) are performed in four directions (0° (MD), 45°, 90° (TD), 135°) of the substrate layer at 23° C. (room temperature). Measurements in four directions are then averaged to calculate 50% elongation stress.

It should be noted that longitudinal and transverse directions of the substrate layer are respectively in agreement with MD (mechanical feed direction) and TD (direction vertical to MD) of an original material of the substrate layer. Specifically, when the substrate layer 11 is made of a biaxially stretched film, the longitudinal and transverse directions of a test piece each should agree with either one of the two stretching directions of the film.

The substrate layer 11 having the 50% elongation stress in the range of 100 to 180 MPa measured as mentioned above provides good processability and enables deep drawing even after heat treatment. From this perspective, the 50% elongation stress of the substrate layer 11 is preferably in the range of 110 to 170 MPa.

The thermal shrinkage of the substrate layer 11 can be specifically measured as follows. That is, a substrate layer cut into an A4 size at 23° C. is heated for 30 minutes in an oven kept at a selected heat treatment temperature in the range of 160° C. to 200° C. After that, lengths of the substrate layer in four directions (0° (MD), 45°, 90° (TD), 135°) at 23° C. are measured. Then, thermal shrinkages in respective directions are calculated using the following formula to obtain an average of them.

Thermal shrinkage(%)=[{Length in each direction (A4 size)measured before heat treatment−Length in each direction measured after heat treatment}/Length in each direction measured before heat treatment]×100

The thermal shrinkage of the substrate layer 11, measured as above, in the range of 1 to 15% achieves appropriate adhesion between the metal foil layer and the sealant layer, and the layers after adhesion can be appropriately taken up to thereby provide a packaging material having good processability as well as good formability. From this perspective, the thermal shrinkage of the substrate layer 11 is preferably in the range of 1 to 8%.

The substrate layer 11 preferably has a thermal shrinkage in the range of 1 to 5% after heat treatment at 160° C. With the shrinkage in this range, a packaging material of good processability is provided. From this perspective, the thermal shrinkage is preferably in the range of 1 to 4%.

Examples of a polyester resin forming the polyester film of the substrate layer 11 include, but are not particularly limited to, as long as the above properties are satisfied, polyethylene terephthalate, polybutylene terephthalate, polyethylene naphthalate, polybutylene naphthalate, and copolyester. Among them, from the perspective of having good deep drawing formability, copolyester is preferably used.

The polyester film may be obtained using either of simultaneous stretch or biaxial stretch. From the perspective of obtaining better deep drawing formability, a biaxially stretched polyester film is preferred.

Examples of stretching method for the biaxially stretched film include sequential biaxial stretch, tubular biaxial stretch, and simultaneous biaxial stretch. From the perspective of obtaining better deep drawing formability, the biaxially stretched film is preferably stretched using tubular biaxial stretch method and simultaneous biaxial stretch method.

The substrate layer 11 preferably has a thickness in the range of 6 to 40 μm and more preferably 10 to 30 μm. When the substrate layer 11 has a thickness of 6 μm or more, pinhole resistance and insulating properties are likely to be improved in the packaging material 10 for a power storage device. If the substrate layer 11 has a thickness of more than 40 μm, the total thickness of the packaging material 10 for a power storage device is increased and the battery electrical capacity may have to be reduced. Therefore, the thickness of this range is not desirable.

(Adhesion Enhancement Layer 12)

The adhesion enhancement layer 12 is provided to a surface of the substrate layer 11 and is arranged between the substrate layer 11 and the adhesive layer 13. The adhesion enhancement layer 12 improves adhesion between the substrate layer 11 and the adhesive layer 13 and even improves adhesion between the substrate layer 11 and the metal foil layer 14. The adhesion enhancement layer 12 does not have to be necessarily provided to the packaging material 10 for a power storage device. In the absence of the adhesion enhancement layer 12, an adhesive layer 13 side surface of the substrate layer 11 may be corona-treated to improve adhesion between the substrate layer 11 and the adhesive layer 13 and to even improve adhesion between the substrate layer 11 and the metal foil layer 14.

The adhesion enhancement layer 12 preferably contains at least one resin selected from the group consisting of a polyester resin, an acrylic resin, a polyurethane resin, an epoxy resin, and an acrylic-grafted polyester resin. Such an adhesion enhancement layer 12 can be formed by, for example, applying a coating agent onto a surface of the substrate layer 11. The coating agent in this case contains at least one resin as a main resin selected from the group consisting of a polyester resin, an acrylic resin, a polyurethane resin, an epoxy resin, and an acrylic-grafted polyester resin <Polyester Resin>

From the perspective of adhesion, the polyester resin is preferably a copolyester in which a copolymerization component is introduced for lowering of glass transition temperature. From the perspective of coating properties, the copolyester is preferably water soluble or water dispersible. Such a copolyester is preferably one in which at least one group selected from the group consisting of a sulfonic acid group and an alkali metal salt group thereof is bonded (termed hereinafter as "sulfonic acid group-containing copolyester").

The sulfonic acid group-containing copolyester refers to a polyester in which at least one group selected from the group consisting of a sulfonic acid group and an alkali metal salt group thereof is bonded to part of a dicarboxylic acid component or a glycol component. In particular, the copolyester is preferably prepared by using an aromatic dicarboxylic acid component containing at least one group selected from the group consisting of a sulfonic acid group and an alkali metal salt group thereof, at a ratio from 2 to 10 mol % relative to the total acid components.

As an example of such dicarboxylic acid, sodium 5-sulfoisophthalate is preferred. Examples of other dicarboxylic acid components include terephthalic acid, isophthalic acid, phthalic acid, p-β-oxyethoxybenzoic acid, 2,6-naphthalenedicarboxylic acid, 4,4'-dicarboxydiphenyl, 4,4'-dicarboxybenzophenone, bis(4-carboxyphenyl)ethane, adipic acid, sebacic acid, and cyclohexane-1,4-dicarboxylic acid.

Ethylene glycol is mainly used as a glycol component for preparing the sulfonic acid group-containing copolyester. Besides, there can be used propylene glycol, butanediol, neopentyl glycol, diethylene glycol, cyclohexane dimethanol, ethylene oxide adduct of bisphenol A, polyethylene glycol, polypropylene glycol, polytetramethylene glycol and the like. Of these, the use, as a copolymerizable component, of ethylene glycol, propylene glycol, butanediol, neopentyl glycol, diethylene glycol, cyclohexane dimethanol or the like is preferred in that compatibility with a polystyrene sulfonate salt is improved.

As the polyester resin, a modified polyester copolymer may be used, such as a block copolymer or a graft copolymer, modified with polyester, urethane, epoxy, or the like. In the present embodiment, a resin other than the polyester resin may be further added to the adhesion enhancement layer 12 to improve adhesion of the adhesion enhancement layer 12 to the substrate layer 11 and the adhesive layer 13. Such a resin may be, for example, a urethane resin, an acrylic resin, or the like.

<Acrylic Resin>

Examples of a usable monomer component forming an acrylic resin include: alkyl acrylate, alkyl methacrylate (alkyl groups include a methyl group, ethyl group, n-propyl group, isopropyl group, n-butyl group, isobutyl group, t-butyl group, 2-ethyl hexyl group, lauryl group, stearyl group, cyclohexyl group, phenyl group, benzyl group, and phenylethyl group); hydroxyl group—containing monomers, such as 2-hydroxyethyl acrylate, 2-hydroxyethyl methacrylate, 2-hydroxypropylacrylate, and 2-hydroxypropylmethacrylate; amide group-containing monomers, such as acrylamide, methacrylamide, N-methylacrylamide, N-methylmethacrylamide, N-methylol acrylamide, N-methylol methacrylamide, N,N-dimethylol acrylamide, N-methoxymethylacrylamide, N-methoxymethylmethacrylamide, and N-phenylacrylamide; amino group-containing monomers, such as N,N-diethyl aminoethyl acrylate, and N,N-diethyl aminoethyl methacrylate; epoxy group-containing monomers, such as glycidyl acrylate and glycidyl methacrylate; carboxyl groups, such as acrylic acid, methacrylic acid, and salts thereof (lithium salt, sodium salt, potassium salt, and the like) or monomers containing the salts. These materials may be used singly, or in combination of two or more for copolymerization. Moreover, these materials can be combined with monomers other than ones mentioned above.

Examples of other monomers that can be used include: epoxy group-containing monomers, such as allyl glycidyl ether; sulfonic groups, such as styrene sulfonic acid, vinyl sulfonic acid and salts thereof (lithium salt, sodium salt, potassium salt, ammonium salt, and the like), or monomers containing the salts; carboxyl groups, such as crotonic acid, itaconic acid, maleic acid, fumaric acid, and salts thereof (lithium salt, sodium salt, potassium salt, ammonium salt, and the like), or monomers containing the salts; monomers containing acid anhydrides, such as maleic anhydride and anhydrous itaconic acid; vinyl isocyanate, allyl isocyanate, styrene, vinyl methylether, vinyl ethyl ether, vinyl-tris alkoxysilane, alkylmaleic acid monoester, alkylfumaric acid monoester, acrylonitrile, methacrylonitrile, alkylitaconic acid monoester, vinylidene chloride, vinyl acetate, and vinyl chloride. Examples of acrylic resins that may be used include modified acrylic copolymers, such as block copolymers, graft copolymers, and the like, which are modified by polyester, urethane, epoxy, or the like.

The acrylic resin used in the present embodiment preferably has a glass transition point (Tg), but is not particularly limited to, in the range of 0 to 90° C. and more preferably from 10 to 80° C. A lower Tg may impair adhesion at high temperature and high humidity while a higher Tg may develop cracks during stretching. Therefore, from the perspective of avoiding these conveniences, the acrylic resin preferably has a Tg in the above range.

The acrylic resin used in the present embodiment preferably has a weight average molecular weight of 100,000 or more, and more preferably 300,000 or more. A lower weight average molecular weight may decrease heat resistance and humidity resistance. In the present embodiment, to improve adhesion of the adhesion enhancement layer 12 with the substrate layer 11 and the adhesive layer 13, the adhesion enhancement layer 12 may be permitted to further contain a resin other than the acrylic resin. Examples of such a resin include a polyester resin, and a urethane resin.

<Polyurethane Resin>

As the polyurethane resin, an aqueous polyurethane resin is preferred. The aqueous polyurethane resin is preferably of a self-emulsifying type because of having a small particle size and good stability. The aqueous polyurethane resin may have a particle size approximately in the range of 10 to 100 nm. The aqueous polyurethane resin used for the present embodiment desirably has a glass transition point (Tg) in the range of 40° C. to 150° C. A Tg of 40° C. or more may be able to sufficiently inhibit the occurrence of blocking while the film is taken up onto a roll after coating. A Tg excessively higher than the dry temperature after coating causes difficulty when forming a uniform film, and thus Tg is preferably 150° C. or less.

In the present embodiment, a cross-linking agent may be used together with the aqueous polyurethane resin. The cross-linking agent for aqueous polyurethane that can be used may be a general-purpose water soluble cross-linking agent, such as a water-soluble epoxy compound. The water-soluble epoxy compound has water solubility and has two or more epoxy groups. Examples of the water soluble epoxy compound include: polyepoxy compounds obtained by etherification of 2 mol of epichlorohydrin and 1 mol of glycols, such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, and neopentyl glycol; and diepoxy compounds obtained by esterification of 2 mol of epichlorohydrin and 1 mol of dicarboxylic acids, such as phthalic acid, terephthalic acid, adipic acid, and oxalic acid. The water-soluble epoxy compound is not limited to these.

Such a water soluble cross-linking agent forms a cross-link with the aqueous polyurethane resin to improve water resistance and solvent resistance of the coating and also improve adhesion of the adhesion enhancement layer 12 with the substrate layer 11 and the adhesive layer 13. In the present embodiment, to improve adhesion of the adhesion enhancement layer 12 with the substrate layer 11 and the adhesive layer 13, the adhesion enhancement layer 12 may be permitted to further contain a resin other than the urethane resin. Examples of such a resin include a polyester resin, and an acrylic resin.

The adhesion enhancement layer 12 may be formed containing, for example, the resins mentioned above as a main component and a curing agent, such as multifunctional isocyanate, a multifunctional glycidyl compound, and a melamine-based compound. Containing the resins mentioned above as a main component and a curing agent, such as multifunctional isocyanate, a multifunctional glycidyl compound, and a melamine-based compound, a cross-linking structure can be incorporated into the adhesion enhancement layer 12 to make the layer strong and hard.

The coating agent used for forming the adhesion enhancement layer 12 may be solvent based or water based. A dispersible (dispersion) coating agent using a water based main resin has a large molecular weight and improves intermolecular cohesive force and is thus effective for the adhesion of the adhesion enhancement layer 12 with the substrate layer 11 and the adhesive layer 13.

The adhesion enhancement layer 12 preferably has a thickness in the range of 0.02 to 0.5 µm and more preferably 0.04 to 0.3 The adhesion enhancement layer 12 having a thickness of 0.02 µm or more facilitates formation of a uniform adhesion enhancement layer 12 and may be able to obtain a more sufficient easily-adhesive effect. The adhesion enhancement layer 12 having a thickness of 0.5 µm or less may be able to even more improve deep drawing formability of the packaging material 10.

(Adhesive Layer 13)

The adhesive layer 13 adheres the substrate layer 11 to the metal foil layer 14. The adhesive layer 13 is adhered to the substrate layer 11 via the adhesion enhancement layer 12. The adhesive layer 13 has an adhesive force needed to firmly adhere the substrate layer 11 to the metal foil layer 14 and also has conformability (ability to reliably form the adhesive layer 13 on a member without separation, even when the member is deformed, stretched or contracted) to prevent breaking of the metal foil layer 14 by the substrate layer 11 during cold forming.

As an adhesive constituting the adhesive layer 13, there can be used a two-part curing type polyurethane adhesive comprising, for example, a main resin made of a polyol such as a polyester Polly, a polyether polyol, an acrylic polyol or the like, and a curing agent such as an aromatic or aliphatic isocyanate. In this adhesive, the molar ratio (=NCO/OH) of the isocyanate groups of the curing agent to the hydroxyl groups of the main resin is preferably in the range of 1 to 10, and more preferably 2 to 5.

After being applied, the polyurethane adhesive is aged at 40° C. for 4 days or longer, for example. The aging advances the reaction of the hydroxyl group of the base resin with the isocyanate group of the curing agent, allowing more firm adhesion of the substrate layer 11 to the metal foil layer 14.

From the perspective of obtaining desired adhesive strength, conformability, processability, and the like, the thickness of the adhesive layer 13 is preferably in the range of 1 to 10 µm, and more preferably 2 to 6 µm.

(Metal Foil Layer 14)

Examples of the metal foil layer 14 include various types of metal foil such as of aluminum and stainless steel. The metal foil layer 14 is preferably aluminum foil from the perspective of processability, such as moisture resistance, ductility and malleability, and costs. The aluminum foil may be generally used soft aluminum foil, but aluminum foil containing iron is preferred for having good pinhole resistance, ductility and malleability.

The aluminum foil containing iron (100 mass %) preferably has an iron content in the range of 0.1 to 9.0 mass % and more preferably 0.5 to 2.0 mass %. The iron content of 0.1 mass % or more may lead to obtaining a packaging material 10 having better pinhole resistance, and ductility and malleability. The iron content of 9.0 mass % or less may lead to obtaining a packaging material 10 with better flexibility.

From the perspective of imparting desired ductility and malleability during forming, an annealed soft aluminum foil (e.g., aluminum foil made of the material 8021 of 8079 according to the Japanese Industrial Standards) is even more preferred as the aluminum foil.

The metal foil used for the metal foil layer 14 is preferably degreased, for example, to obtain desired electrolyte resistance. To simplify the production procedure, the metal foil preferably has a surface that is not etched. The degreasing treatment, for example, may be of wet or dry type. However, dry degreasing treatment is preferred from the perspective of simplifying the production procedure.

An example of dry degreasing treatment may be one where treatment time is increased in the step of annealing the metal foil. Sufficient electrolyte resistance may be obtained with the degreasing treatment that is carried out simultaneously with the annealing treatment for softening the metal foil.

The dry degreasing treatment may be one, such as flame treatment and corona treatment, that is other than the annealing treatment. Further, the dry degreasing treatment may be one that oxidatively decomposes and removes contaminants using active oxygen generated by irradiating the metal foil with ultraviolet rays at a specific wavelength.

For example, the wet degreasing treatment may be acid degreasing treatment, alkaline degreasing treatment, or the like. Examples of the acid used for the acid degreasing treatment include inorganic acids, such as sulfuric acid, nitric acid, hydrochloric acid, and hydrofluoric acid. These acids may be used singly or in combination of two or more. For example, the alkali used for the alkaline degreasing treatment may be sodium hydroxide having a high etching effect. Alkaline degreasing treatment may be performed using a material formulated by adding a surfactant or the like to a weakly alkaline material. The wet degreasing treatment set forth above may be performed through immersion or spraying, for example.

From the perspective of barrier properties, pinhole resistance, and processability, the metal foil layer 14 preferably has a thickness in the range of 9 to 200 μm, more preferably 15 to 150 μm, and even more preferably 15 to 100 μm. The metal foil layer 14 with a thickness of 9 μm or more may be able to make the layer less breakable even when stress is applied thereto by molding. The metal foil layer 14 with a thickness of 200 μm or less may be able to curb the increase in mass of the packaging material and minimize the decrease in weight energy density of the power storage device.

(Anticorrosion Treatment Layers 15a and 15b)

The anticorrosion treatment layers 15a and 15b prevent or suppress corrosion of the metal foil layer 14 due to the electrolyte or hydrofluoric acid produced by reaction of the electrolyte with water. The anticorrosion treatment layer 15a increases the adhesive force between the metal foil layer 14 and the adhesive layer 13. The anticorrosion treatment layer 15b increases the adhesive force between the metal foil layer 14 and the sealant adhesive layer 16. The anticorrosion treatment layers 15a and 15b may be identically formed or may be differently formed. FIG. 1 illustrates the case where the anticorrosion treatment layers are formed on opposing surfaces of the metal foil layer 14. However, the anticorrosion treatment layer may be formed on at least one surface of the metal foil layer 14.

The anticorrosion treatment layers 15a and 15b can be formed by, for example, applying degreasing treatment, hydrothermal conversion treatment, anodizing treatment, chemical conversion treatment, or coating-type anticorrosion treatment wherein a coating agent having anticorrosion ability is coated, or a combination of these treatments, to a layer serving as a base material for the anticorrosion treatment layers 15a and 15b.

Of the above treatments, the degreasing treatment, hydrothermal conversion treatment and anodizing treatment, particularly, the hydrothermal conversion treatment and the anodizing treatment, are ones wherein the metal foil (aluminum foil) is dissolved with a treating agent on the surface thereof to form a metal compound (aluminum compound (boehmite, alumite)) having good corrosion resistance. In this sense, these treatments may be embraced within the definition of chemical conversion treatments because they provide a co-continuous structure that is formed covering from the metal foil layer 14 to the anticorrosion treatment layers 15a and 15b.

Examples of the degreasing treatment include acid degreasing treatment and alkaline degreasing treatment. The acid degreasing treatment may be one using the inorganic acid mentioned above, such as sulfuric acid, nitric acid, hydrochloric acid, and hydrofluoric acid, singly or using acid obtained by mixing them, or the like. Use of an acid degreasing agent, as the acid degreasing treatment, obtained by dissolving a fluorine-containing compound, such as monosodium ammonium bifluoride, with the above inorganic acid can not only achieve the degreasing effect of the metal foil layer 14, but form a passive state metal fluoride, and is thus effective in terms of hydrofluoric acid resistance. The alkaline degreasing treatment may be one using sodium hydroxide, or the like.

For example, the hydrothermal conversion treatment that can be used may be boehmite treatment of immersing the metal foil layer 14 in boiling water with triethanolamine added thereto. For example, the anodizing treatment that can be used may be alumite treatment. Examples of the chemical conversion treatment that can be used include chromate treatment, zirconium treatment, titanium treatment, vanadium treatment, molybdenum treatment, calcium phosphate treatment, strontium hydroxide treatment, cerium treatment, ruthenium treatment, or treatment that is a combination of two or more of these treatments. When performing the hydrothermal conversion treatment, anodizing treatment or chemical conversion treatment, the aforementioned degreasing treatment is preferably performed in advance.

The chemical conversion treatment is not limited to a wet type, but may be one, for example, in which treatment agents used for the treatment are mixed with a resin component and applied. The anticorrosion treatment may preferably be of a coating type chromate treatment because it maximizes the anticorrosion effect and is convenient for liquid waste disposal.

The coating agent used in the coating type anticorrosion treatment wherein a coating agent having anticorrosion ability is applied includes one which contains at least one selected from the group consisting of a rare earth element oxide sol, an anionic polymer and a cationic polymer. Especially, a preferred method is one using a coating agent containing a rare earth element oxide sol.

The method using a coating agent containing a rare earth element oxide sol is a pure coating type anticorrosion treatment. When using this method, an anticorrosion effect can be imparted to the metal foil layer 14 even according to ordinary coating methods. The layer formed by use of a rare earth element oxide sol has an anticorrosion effect (inhibitor effect) on the metal foil layer 14 and these sols are favorable materials from an environmental aspect.

The rare earth element oxide sol contains microparticles (e.g., particles having a mean particle size of 100 nm or less) of rare earth element oxide dispersed in a liquid dispersion medium. As the rare earth element oxide, mention can be made of cerium oxide, yttrium oxide, neodymium oxide, lanthanum oxide, or the like. Cerium oxide is preferred among them. This allows more improvement in adhesion with the metal foil layer 14. Examples of the liquid dispersion medium used for the rare earth element oxide sol include various solvents, such as, water, alcoholic solvents, hydrocarbon-based solvents, ketone-based solvents, ester-based solvents, and ether-based solvents. Water is preferred among them. The rare earth element oxides contained in the anticorrosion treatment layers 15a and 15b may be used singly or in combination of two or more.

To stabilize dispersion of the rare earth element oxide particles, the rare earth element oxide sol preferably contains a dispersion stabilizer, including an inorganic acid, such as nitric acid, hydrochloric acid, or phosphoric acid, an organic acid, such as acetic acid, malic acid, ascorbic acid, or lactic acid, a salt of these acids, or the like. Of these dispersion stabilizers, phosphoric acid or phosphate in particular is preferably used. In addition to stabilizing dispersion of the rare earth element oxide particles, use of these materials achieves such effects, in the usage of the packaging material for a lithium ion battery, as improving adhesion to the metal foil layer 14 with the chelating ability of phosphoric acid, imparting electrolyte resistance by trapping metal ions eluted due to the influence of hydrofluoric acid (forming a passive state), improving cohesive force of the rare earth element oxide layer due to the ease of producing dehydration condensation of phosphoric acid even at low temperatures, and the like. Examples of the phosphoric acid or phosphate used as the dispersion stabilizer include orthophosphoric acid, pyrophosphoric acid, metaphosphoric acid, alkali metal salt or ammonium salt thereof, and the like. Of these materials, condensed phosphoric acid, such as trimetaphosphoric acid, tetrametaphosphoric acid, hexametaphosphoric acid, and ultrametaphosphoric acid, or alkali metal salt or ammonium salt thereof is preferred in terms of allowing the packaging material for a lithium ion battery to express its function. In particular, considering the dry film formability (drying capacity, heat capacity) when forming a layer containing rare earth oxide through various types of coating method using a coating composition containing the rare earth element oxide sol, an agent having good reactivity at low temperatures is preferred. Specifically, a sodium salt is preferred because of its good dehydration condensation properties at low temperatures. As the phosphate, a water-soluble salt is preferred. Phosphoric acids or phosphates contained in the anticorrosion treatment layers 15a and 15b may be used singly or in combination of two or more.

Phosphoric acid or salt thereof is blended in the rare earth element oxide sol preferably in an amount of 1 part by mass or more, and more preferably 5 parts by mass or more, relative to 100 parts by mass of rare earth element oxide. A content of 1 part by mass or more can achieve good stability of the sol and easily satisfy the function as the packaging material for a lithium ion battery. The upper limit of phosphoric acid or salt thereof to be blended relative to 100 parts by mass of rare earth element oxide may be in a range not lowering the function of the rare earth element oxide sol, and may preferably be 100 parts by mass or less, more preferably 50 parts by mass or less, and even more preferably 20 parts by mass or less, relative to 100 parts by mass of rare earth element oxide.

The layer formed from the rare earth element oxide sol is an aggregate of inorganic particles and therefore the cohesive force of the layer is low even after a dry curing step. To compensate the cohesive force of this layer, complexing with an anionic polymer is favorable.

A specific example of the anionic polymer may be a polymer having a carboxyl group, examples of which include poly(meth)acrylic acid (or a salt thereof) and copolymers having poly(meth)acrylic acid as a main component thereof. Examples of the copolymerization component of the copolymers include: alkyl(meth)acrylate-based monomers (of which examples of alkyl groups include a methyl group, an ethyl group, an n-propyl group, an i-propyl group, an n-butyl group, an i-butyl group, a t-butyl group, a 2-ethylhexyl group, and a cyclohexyl group); amide group-containing monomers, such as (meth)acrylamide, N-alkyl(meth)acrylamide, N,N-dialkyl(meth)acrylamide (of which examples of alkyl groups include a methyl group, an ethyl group, an n-propyl group, an i-propyl group, an n-butyl group, an i-butyl group, a t-butyl group, a 2-ethylhexyl group, and a cyclohexyl group), N-alkoxy(meth)acrylamide, N,N-dialkoxy(meth)acrylamide (of which examples of alkoxy groups include a methoxy group, an ethoxy group, a butoxy group, and an isobutoxy group), N-methylol(meth)acrylamide, and N-phenyl(meth)acrylamide; hydroxyl group-containing monomers, such as 2-hydroxyethyl(meth)acrylate and 2-hydroxypropyl(meth)acrylate; glycidyl group-containing monomers, such as glycidyl(meth)acrylate and allyl glycidyl ether; silane-containing monomers, such as (meth)acryloxypropyl trimethoxysilane and (meth)acryloxypropyl triethoxysilane; and isocyanate group-containing monomers, such as (meth)acryloxypropyl isocyanate. The examples also include styrene, α-methylstyrene, vinyl methyl ether, vinyl ethyl ether, maleic acid, alkyl maleate monoester, fumaric acid, alkyl fumarate monoester, itaconic acid, alkyl itaconate monoester, (meth)acrylonitrile, vinylidene chloride, ethylene, propylene, vinyl chloride, vinyl acetate, and butadiene.

The anionic polymer improves the stability of the anticorrosion treatment layers 15a and 15b (oxide layers) obtained using the rare earth element oxide sol. This is achieved by the effect of protecting the hard and brittle oxide layers with an acrylic resin component, and the effect of capturing ionic contamination (particularly, sodium ion) derived from the phosphate contained in the rare earth oxide sol (cation catcher). In other words, when alkali metal ion or alkaline earth metal ion, such as sodium in particular, is contained in the anticorrosion treatment layers 15a and 15b obtained by use of the rare earth element oxide sol, the anticorrosion treatment layers 15a and 15b are prone to deteriorate starting from the ion-containing site. Accordingly, sodium ion or the like contained in the rare earth oxide sol is immobilized by use of the anionic polymer to thereby improve durability of the anticorrosion treatment layers 15a and 15b.

The anticorrosion treatment layers 15a and 15b produced by combining the anionic polymer with the rare earth element oxide sol have anticorrosion ability equivalent to that of the anticorrosion treatment layers 15a and 15b formed by applying chromate treatment to the metal foil layer 14. The anionic polymer preferably has a structure where a substantially water soluble polyanionic polymer is cross-linked. For example, the cross-linking agent used for forming this structure may be a compound having an isocyanate group, a glycidyl group, a carboxy group, or an oxazoline group. A silane coupling agent may be used for introducing a cross-linking site having a siloxane bond.

Examples of the compound having an isocyanate group include: diisocyanates such as tolylene diisocyanate, xylylene diisocyanate or its hydrogenated product, hexamethylene diisocyanate, 4,4'-diphenylmethane diisocyanate or its hydrogenated product, and isophorone diisocyanate; polyisocyanates including adducts of these isocyanates reacted with polyhydric alcohols such as trimethylolpropane, biuret forms obtained by reaction of the isocyanates with water, or isocyanurate forms that are trimers of the isocyanates; or blocked polyisocyanates obtained by blocking these polyisocyanates with alcohols, lactams, oximes and the like.

Examples of the compound having a glycidyl group include: epoxy compounds obtained by reaction of glycols, such as ethylene glycol, diethylene glycol, triethylene glycol, polyethylene glycol, propylene glycol, dipropylene glycol, tripropylene glycol, polypropylene glycol, 1,4-butadiene, 1,6-hexanediol, and neopentyl glycol, with epichlorohydrin; epoxy compounds obtained by reaction of polyhydric alcohols, such as glycerine, polyglycerine, trimethylolpropane, pentaerythritol, and sorbitol, with epichlorohydrin; and epoxy compounds obtained by reaction of dicarboxylic acids, such as phthalic acid, terephthalic acid, oxalic acid, and adipic acid, with epichlorohydrin.

The compounds having a carboxy group include various aliphatic or aromatic dicarboxylic acids, and include, further, poly(meth)acrylic acids, or alkali (earth) metal salts of poly(meth)acrylic acids.

The compounds having an oxazoline group include, for example, low molecular weight compounds having two or more oxazoline units. Alternatively, where polymerizable monomers such as isopropenyl oxazoline are used, mention may be made of compounds obtained by copolymerizing acrylic monomers such as (meth)acrylic acid, (meth)acrylic alkyl esters, hydroxyalkyl (meth)acrylates and the like.

The silane coupling agents include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, and γ-isocyanatopropylethoxysilane. Especially, when the reactivity with an anionic polymer is considered, an epoxysilane, an aminosilane and an isocyanate silane are preferred.

The cross-linking agent is blended in an amount preferably in the range of 1 to 50 parts by mass, and more preferably from 10 to 20 parts by mass, relative to 100 parts by mass of the anionic polymer. When the ratio of the cross-linking agent is 1 part by mass or more relative to 100 parts by mass of the anionic polymer, a cross-linking structure is easily sufficiently formed. When the ratio of the cross-linking agent is 50 parts by mass or less relative to 100 parts by mass of the anionic polymer, the pot life of the coating agent improves.

The method of cross-linking the anionic polymer is not limited to the use of the aforementioned cross-linking agents, but may be one using a titanium or zirconium compound to form ionic crosslinkage. The coating composition forming the anticorrosion treatment layer 15a may be applied to these materials.

The anticorrosion treatment layers 15a and 15b described above are formed as chemical conversion treatment layers on the metal foil layer 14 using chemical conversion treatment, typical of which is chromate treatment. To form a graded structure in association with the metal foil layer 14, the metal foil layer 14 is treated, in the chemical conversion treatment, with a chemical conversion treatment agent, which is particularly formulated with addition of hydrofluoric acid, hydrochloric acid, nitric acid, sulfuric acid or a salt thereof. The treated metal foil layer 14 is then reacted with a chromium or non-chromium compound to form the chemical conversion treatment layers on the metal foil layer 14. However, the chemical conversion treatment using the acid as the chemical conversion treatment agent may entail environmental degradation and corrosion of the coating apparatus.

In contrast, the anticorrosion treatment layers 15a and 15b of coating type as mentioned above do not have to form a graded structure with respect to the metal foil layer 14, unlike in the chemical conversion treatment typical of which is chromate treatment. Accordingly, the nature of the coating agent should not be restricted to acidity, alkalinity, neutrality, or the like, and accordingly a good work environment is achieved. In addition, an alternative to chromate treatment using a chromium compound is sought in terms of environmental health. From this perspective as well, the anticorrosion treatment layers 15a and 15b of coating type are preferred.

The anticorrosion treatment layers 15a and 15b may have a laminated structure in which a cationic polymer is further laminated as needed. The cationic polymer may be polyethyleneimine, an ionic polymer complex made of a polyethyleneimine and a polymer having carboxylic acid, a primary amine-grafted acrylic resin having a primary amine grafted to a main acrylic backbone, polyallylamine and derivatives thereof, or an aminophenol resin.

Examples of the "polymer having carboxylic acid" forming the ionic polymer complex include polycarboxylic acid (salt), a copolymer produced by introducing a comonomer into polycarboxylic acid (salt), and polysaccharides having a carboxy group. Examples of the polycarboxylic acid (salt) include polyacrylic acid, and ionic salts thereof. Examples of the polysaccharides having a carboxy group include carboxymethylcellulose, and ionic salts thereof. Examples of the ionic salt include an alkali metal salt, and alkaline earth metal.

The primary amine-grafted acrylic resin is a resin having a primary amine grafted to a main acrylic backbone. The acrylic main backbone may include various monomers, such as poly(meth)acrylic acid, used for the acrylic polyol mentioned above. The primary amine grafted to the acrylic main backbone may be ethyleneimine or the like.

The polyallylamine or a derivative thereof that can be used may be a homopolymer or a copolymer of allylamine, allylamine amide sulfate, diallylamine, dimethylallylamine, and the like. These amines may be used in the form of free amine, or may be stabilized by acetic acid or hydrochloric acid. The copolymer may contain maleic acid, sulfur dioxide, or the like as a component. A type of amine imparted with thermal cross-linking properties by partially methoxylating a primary amine may be used. These cationic polymers may be used singly or in combination of two or more. Of these cationic polymers, at least one selected from the group consisting of polyallylamine and a derivative thereof is preferred.

The cationic polymer is preferably used in combination with a cross-linking agent having a functional group capable of reacting with amine/imine, such as a carboxy group or a glycidyl group. The cross-linking agent to be used in combination with the cationic polymer may be a polymer having carboxylic acid that forms an ionic polymer complex with polyethyleneimine, of which examples include: polycarboxylic acid (salt), such as polyacrylic acid or ionic salt thereof; a copolymer produced by introducing a comonomer thereinto; and polysaccharides having a carboxy group, such as carboxymethylcellulose or ionic salt thereof.

In the present embodiment, a cationic polymer is described as a component constituting the anticorrosion treatment layers 15a and 15b. This is based on an intensive investigation using various compounds to find ones imparting electrolyte resistance and hydrofluoric acid resistance to the packaging material for a lithium ion battery as required thereof. As a result, cationic polymers have been found to be compounds that are capable of imparting electrolyte resistance and hydrofluoric acid resistance. This is believed to be because damage to the metal foil layer 14 is suppressed and reduced by capturing fluoride ion with the cationic group (anion catcher). The cationic polymer is also quite preferred from the perspective of improving adhesion between the anticorrosion treatment layer 15b and the sealant adhesive layer 16. Since the cationic polymer is water soluble similar to the anionic polymer mentioned above, water resistance is improved by forming a cross-linking structure using the cross-linking agent mentioned above. Thus, a cross-linking structure can also be formed by using the cationic polymer. Accordingly, when the rare earth oxide sol is used for forming the anticorrosion treatment layers 15a and 15b, the cationic polymer may be used as the protective layer instead of the anionic polymer.

From the above description, combinations of the above coating type anticorrosion treatments may be (1) rare earth oxide sol alone, (2) anionic polymer alone, (3) cationic polymer alone, (4) rare earth oxide sol+anionic polymer (laminated composite), (5) rare earth oxide sol+cationic polymer (laminated composite), (6) (rare earth oxide sol+ anionic polymer: laminated composite)/cationic polymer (multilayer), (7) (rare earth oxide sol+cationic polymer: laminated composite)/anionic polymer (multilayer), and the like. Of these combinations, (1) and (4) through (7) are preferred and (4) through (7) are more preferred. For the anticorrosion treatment layer 15a, (6) is particularly preferred because an anticorrosion effect and an anchor effect (adhesion improvement effect) are achieved by a single layer. For the anticorrosion treatment layer 15b, (6) and (7) are particularly preferred because it is easier to keep the sealant layer 17 side electrolyte resistance. However, the present embodiment should not be limited to the above combinations. An example of selecting the anticorrosion treatment is as follows. Specifically, when the sealant adhesive layer 16 is formed of a modified polyolefin resin, the cationic polymer is designed to be provided on the surface contacting the sealant adhesive layer 16 (e.g., configurations (5) and (6)) since the cationic polymer is a material quite preferable in terms of good adhesion with a modified polyolefin resin that will be mentioned in the sealant adhesive layer 16 below.

The anticorrosion treatment layers 15a and 15b are not limited to the layers described above. For example, they may be formed by using an agent produced by blending phosphoric acid and a chromium compound into a resin binder (aminophenol resin etc.), as in a coating type chromate based on a known technique. Use of this treatment agent enables formation of a layer that is both corrosion-resistant and adhesive. To improve adhesion, the chemical conversion treatment layer described above (the layer formed through degreasing treatment, hydrothermal conversion treatment, anodizing treatment, chemical conversion treatment, or a combination thereof) may be treated in a composite manner using the cationic polymer and/or the anionic polymer mentioned above. Alternatively, using these treatments in combination, the cationic polymer and/or the anionic polymer may be laminated as a multilayer structure. While the stability of the coating agent has to be considered, a layer that is both corrosion-resistant and adhesive can be achieved by using a coating agent that is a one-liquid product of the rare earth oxide sol and the cationic polymer or the anionic polymer obtained in advance.

The anticorrosion treatment layers 15a and 15b preferably have mass per unit area in the range of 0.005 to 0.200 g/m$^2$, and more preferably 0.010 to 0.100 g/m$^2$. When 0.005 g/m$^2$ or more, the metal foil layer 14 can be easily made more corrosion-resistant. The mass per unit area exceeding 0.200 g/m$^2$ will saturate the anticorrosivity and make little change therein. In contrast, when the rare earth oxide sol is used, a thick coating may cause insufficient thermal curing during drying and decrease the cohesive force. Although the above description is given using mass per unit area, the specific gravity, if available, can be used in terms of thickness.

The respective thicknesses of the anticorrosion treatment layers 15a and 15b are preferably, for example, in the range of 10 nm to 5 μm, and more preferably 20 to 500 nm, from the perspective of corrosion-resistant and anchoring functions.

(Sealant Adhesive Layer 16)

The sealant adhesive layer 16 adheres the sealant layer 17 to the metal foil layer 14 formed with the anticorrosion treatment layer 15b. The packaging material 10 is roughly categorized into a heat lamination structure and a dry lamination structure, depending on the adhesive component forming the sealant adhesive layer 16.

The adhesive component forming the sealant adhesive layer 16 in the heat lamination structure is preferably an acid modified polyolefin-based resin obtained by graft modifying a polyolefin-based resin with acid. The acid modified polyolefin-based resin, which has a polar group introduced into part of the nonpolar polyolefin-based resin, can firmly adhere to both the sealant layer 17 composed of a nonpolar polyolefin-based resin film or the like, and the anticorrosion treatment layer 15b mostly having polarity. Use of the acid modified polyolefin-based resin improves resistance of the packaging material 10 to the contents, such as the electrolyte, and easily prevents lowering of the adhesive force due to deterioration of the sealant adhesive layer 16 even when hydrofluoric acid is produced inside the battery.

Examples of the polyolefin-based resin for the acid modified polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin that can be used may also be a copolymer obtained by copolymerizing polar molecules such as of acrylic acid or methacrylic acid with those materials mentioned above, a polymer such as cross-linked polyolefin, or the like. The acid to modify the polyolefin-based resin may be carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the heat lamination structure is formed by extruding the aforementioned adhesive component with an extruder. The sealant adhesive layer 16 of the heat lamination structure preferably has a thickness in the range of 2 to 50 μm.

The adhesive component forming the sealant adhesive layer 16 of the dry lamination structure may be ones, for example, similar to those mentioned for the adhesive layer 13. In this case, to prevent or reduce swelling due to the electrolyte, and hydrolysis due to hydrofluoric acid, the composition of the adhesive is preferably designed so as to contain a main resin with a backbone not easily hydrolyzed and improve cross-linking density.

To improve cross-linking density, some substance may be added to the adhesive, the substance being, for example, a dimer fatty acid, an ester or a hydrogenated product of the dimer fatty acid, a reduced glycol of the dimer fatty acid, or a reduced glycol of the ester or the hydrogenated product of the dimer fatty acid. The dimer fatty acid is obtained by dimerizing various unsaturated fatty acids, and can have a structure, for example, of acyclic type, monocyclic type, polycyclic type, and aromatic ring type.

The fatty acid as a starter of the dimer fatty acid is not particularly limited. With such dimer fatty acid as being an essential component, a dibasic acid such as that used for ordinary polyester polyol may be introduced. The curing agent that can be used for the main resin forming the sealant adhesive layer 16 may be, for example, an isocyanate compound that may also be used as a chain elongation agent for polyester polyol. Thus, cross-linking density of the adhesive coating increases, which leads to improving solubility and swelling properties. Also, substrate adhesion is also expected to be improved due to increase in urethane group concentration.

The sealant adhesive layer 16 having the dry laminate structure has a bonding part such as of an ester group and a urethane group which is easily hydrolysable. Therefore, for usage requiring much higher reliability, an adhesive component having a heat lamination structure is preferably used as the sealant adhesive layer 16. For example, the various curing agents mentioned above are blended into a coating agent wherein the acid modified polyolefin resin is dissolved or dispersed in a solvent, such as toluene or methylcyclohexane (MCH), followed by application and drying to thereby form the sealant adhesive layer 16.

When forming the sealant adhesive layer 16 using extrusion molding, the adhesion resin tends to be oriented in MD (extrusion direction) due to the stress or the like generated during the extrusion molding. In this case, to alleviate the anisotropy of the sealant adhesive layer 16, an elastomer may be blended in the sealant adhesive layer 16. As the elastomer to be blended in the sealant adhesive layer 16, for example, an olefin-based elastomer, a styrene-based elastomer, or the like may be used.

The elastomer preferably has a mean particle size that can improve the compatibility of the elastomer with the adhesive resin and improve the effect of alleviating the anisotropy of the sealant adhesive layer 16. Specifically, the mean particle size of the elastomer is preferably 200 nm or less, for example.

The mean particle size of the elastomer is determined by, for example, capturing an enlarged image of a cross section of an elastomer composition using an electron microscope, followed by image analysis for the measurement of a mean particle size of dispersed cross-linked rubber components. The elastomers mentioned above may be used singly or in combination of two or more.

If an elastomer is blended in the sealant adhesive layer 16, the amount of the elastomer added to the sealant adhesive layer 16 (100 mass %) is, for example, preferably in the range of 1 to 25 mass % and more preferably 10 to 20 mass %. When the blending amount of the elastomer is 1 mass % or more, improvement is likely to be achieved in compatibility with the adhesion resin, and also in the effect of alleviating the anisotropy of the sealant adhesive layer 16. When the blending amount of the elastomer is 25 mass % or less, improvement is likely to be achieved in the effect of preventing or reducing swelling of the sealant adhesive layer 16 due to the electrolyte.

The sealant adhesive layer 16 may be, for example, a dispersed adhesive resin solution in which an adhesive resin is dispersed in an organic solvent.

The sealant adhesive layer 16 when provided to the heat lamination structure preferably has a thickness in the range of 2 to 50 μm, and more preferably 20 to 40 μm. The sealant adhesive layer 16 having a thickness of 2 μm or more can easily obtain sufficient adhesion strength between the metal foil layer 14 and the sealant layer 17. The sealant adhesive layer 16 having a thickness of 50 μm or less can easily reduce the amount of water penetrating from an end surface of the packaging material into the battery element in the interior. The sealant adhesive layer 16 when provided to the dry lamination structure preferably has a thickness in the range of 1 to 5 μm. The sealant adhesive layer 16 having a thickness of 1 μm or more can easily obtain sufficient adhesion strength between the metal foil layer 14 and the sealant layer 17. The sealant adhesive layer 16 having a thickness of 5 μm or less is capable of preventing or reducing cracking therein.

(Sealant Layer 17)

The sealant layer 17 imparts sealability to the packaging material 10 when heat sealed, and is located on the inward side for heat sealing when the power storage device is assembled. The sealant layer 17 may be a resin film made of a polyolefin-based resin or an acid-modified polyolefin-based resin obtained by graft-modifying a polyolefin-based resin with acid such as maleic anhydride. Of these materials, a polyolefin-based resin that improves the barrier properties against water vapor and is capable of forming the shape of the power storage device without being excessively deformed by heat sealing is preferred, and polypropylene is particularly preferred.

Examples of the polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. These polyolefin-based resins may be used singly or in combination of two or more.

Some substance may be added to the above types of polypropylenes, that is, random polypropylene, homo polypropylene, and block polypropylene, the substance being a low crystallinity ethylene-butene copolymer, a low crystallinity propylene-butene copolymer, terpolymer formed of a three-component copolymer of ethylene, butene, and propylene, an anti-blocking agent (AB agent), such as silica, zeolite, and acrylic resin beads, a slip agent, such as a fatty acid amide, or the like.

The acid-modified polyolefin-based resin includes, for example, those resins which are similar to ones mentioned in the sealant adhesive layer 16.

The sealant layer 17 may be a single layer film or may be a multilayer film, which may be selected according to the required ability. For example, to impart moisture resistance, a multilayer film with interposition of resins, such as an ethylene-cyclic olefin copolymer and polymethylpentene, may be used.

The sealant layer 17 may contain various additives, such as a flame retardant, a slip agent, an anti-blocking agent, an antioxidant, a photostabilizer, and a tackifier.

A heat sealable film formed by extrusion may be used as the sealant layer 17. In this case, the orientation of the sealable film tends to conform to the direction of its extrusion. Therefore, from the perspective of alleviating the anisotropy of the sealant layer 17 due to the orientation, an elastomer may be blended in the heat sealable film. Blending an elastomer, blushing of the sealant layer 17 is prevented or reduced when the packaging material 10 for a power storage device is cold-formed for formation of a recess.

The elastomer that can be used for forming the sealant layer 17 may be, for example, the same materials as those mentioned as the elastomer forming the sealant adhesive layer 16. When the sealant layer 17 has a multilayer film structure, at least one of the plurality of layers constituting the multilayer film structure may be configured to contain the elastomer. For example, when the sealant layer 17 has a three-layer laminated structure of random polypropylene layer/block polypropylene layer/random polypropylene layer, the elastomer may be blended in only the block polypropylene layer or only in the random polypropylene layers, or may be blended in both the random polypropylene layers and the block polypropylene layer.

The sealant layer 17 may contain a lubricant to impart lubricity thereto. Then, a recess is formed in the packaging material 10 for a power storage device by cold forming, the sealant layer 17 containing a lubricant can prevent the packaging material 10 from being stretched more than necessary in the areas to be shaped into side portions and corners of the recess where stretching degree is high. This can prevent separation between the metal foil layer 14 and the sealant adhesive layer 16, or prevent breaking and blushing due to cracks in the sealant layer 17 and the sealant adhesive layer 16.

When the sealant layer 17 contains a lubricant, the content in the sealant layer 17 (100 mass %) is preferably in the range of 0.001 to 0.5 mass %. When the content of lubricant is 0.001 mass % or more, blushing of the sealant layer 17 is likely to be further reduced during cold forming. When the content of lubricant is 0.5 mass % or less, lowering in adhesion strength is likely to be minimized with respect to a surface of another layer contacting a surface of the sealant layer 17.

The sealant layer 17 preferably has a thickness in the range of 10 to 100 μm, and more preferably 20 to 60 μm. The sealant layer 17 with a thickness of 10 μm or more achieves sufficient heat sealing strength. The sealant layer 17 with a thickness of 100 μm or less reduces the amount of water vapor penetration from an end of the packaging material.

(Coating Layer 18)

The coating layer 18 imparts good adhesiveness to the packaging material 10 with respect to an acrylic PSA (pressure sensitive adhesive) tape. Since a power storage device provided with the packaging material 10 as a container may be loaded into a device via an acrylic PSA tape, it is preferable that the surface (that is, the substrate layer 11 side surface) of the packaging material 10 adheres well to the tape. Such an acrylic PSA tape is obtained by laminating an acrylic tackifier layer on a substrate such as of a PET film. For example, the acrylic tackifier may be one containing an acrylic copolymer having a hydroxyl group as a main resin, and also containing an isocyanate-based curing agent.

The coating layer 18 preferably contains at least one resin selected from the group consisting of acrylic resins and polyester resins.

Examples of a usable monomer component forming an acrylic resin include: alkyl acrylate, alkyl methacrylate (alkyl groups include a methyl group, ethyl group, n-propyl group, isopropyl group, n-butyl group, isobutyl group, t-butyl group, 2-ethyl hexyl group, lauryl group, stearyl group, cyclohexyl group, phenyl group, benzyl group, and phenylethyl group); hydroxyl group—containing monomers, such as 2-hydroxyethyl acrylate, 2-hydroxyethyl methacrylate, 2-hydroxypropylacrylate, and 2-hydroxypropylmethacrylate; amide group-containing monomers, such as acrylamide, methacrylamide, N-methylacrylamide, N-methylmethacrylamide, N-methylol acrylamide, N-methylol methacrylamide, N,N-dimethylol acrylamide, N-methoxymethylacrylamide, N-methoxymethylmethacrylamide, and N-phenylacrylamide; amino group-containing monomers, such as N,N-diethyl aminoethyl acrylate, and N,N-diethyl aminoethyl methacrylate; epoxy group-containing monomers, such as glycidyl acrylate and glycidyl methacrylate; carboxyl groups, such as acrylic acid, methacrylic acid, and salts thereof (lithium salt, sodium salt, potassium salt, and the like) or monomers containing the salts. These materials may be used singly, or in combination of two or more for copolymerization. Moreover, these materials can be combined with monomers other than ones mentioned above.

Examples of other monomers that can be used include: epoxy group-containing monomers, such as allyl glycidyl ether; sulfonate groups, such as styrene sulfonic acid, vinyl sulfonic acid and salts thereof (lithium salt, sodium salt, potassium salt, ammonium salt, and the like), or monomers containing the salts; carboxyl groups, such as crotonic acid, itaconic acid, maleic acid, fumaric acid, and salts thereof (lithium salt, sodium salt, potassium salt, ammonium salt, and the like), or monomers containing the salts; monomers containing acid anhydrides, such as maleic anhydride and anhydrous itaconic acid; vinyl isocyanate, allyl isocyanate, styrene, vinyl methylether, vinyl ethyl ether, vinyl-tris alkoxysilane, alkylmaleic acid monoester, alkylfumaric acid monoester, acrylonitrile, methacrylonitrile, alkylitaconic acid monoester, vinylidene chloride, vinyl acetate, and vinyl chloride. Examples of acrylic resins that may be used include modified acrylic copolymers, such as block copolymers, graft copolymers, and the like, which are modified by polyester, urethane, epoxy, or the like.

The polyester resin is preferably a copolyester in which a copolymerization component is introduced for lowering of glass transition temperature. From the perspective of coating properties, the copolyester is preferably water soluble or water dispersible. Such a copolyester is preferably one in which at least one group selected from the group consisting of a sulfonic acid group and an alkali metal salt group thereof is bonded (termed hereinafter as "sulfonic acid group-containing copolyester").

The sulfonic acid group-containing copolyester refers to a polyester in which at least one group selected from the group consisting of a sulfonic acid group and an alkali metal salt group thereof is bonded to part of a dicarboxylic acid component or a glycol component. In particular, the copolyester is preferably prepared by using an aromatic dicarboxylic acid component containing at least one group selected from the group consisting of a sulfonic acid group and an alkali metal salt group thereof, at a ratio in a range of 2 to 10 mol % relative to the total acid components.

As an example of such dicarboxylic acid, sodium 5-sulfoisophthalate is preferred. Examples of other dicarboxylic acid components include terephthalic acid, isophthalic acid, phthalic acid, p-β-oxyethoxybenzoic acid, 2,6-naphthalenedicarboxylic acid, 4,4'-dicarboxydiphenyl, 4,4'-dicarboxybenzophenone, bis(4-carboxyphenyl)ethane, adipic acid, sebacic acid, and cyclohexane-1,4-dicarboxylic acid.

Ethylene glycol is mainly used as a glycol component for preparing the sulfonic acid group-containing copolyester. Besides, there can be used propylene glycol, butanediol, neopentyl glycol, diethylene glycol, cyclohexane dimethanol, ethylene oxide adduct of bisphenol A, polyethylene glycol, polypropylene glycol, polytetramethylene glycol and the like. Of these, the use, as a copolymerizable component, of ethylene glycol, propylene glycol, butanediol, neopentyl glycol, diethylene glycol, cyclohexane dimethanol or the like is preferred in that compatibility with a polystyrene sulfonate salt is improved.

The acrylic resin and the polyester resin may each be used singly or in combination of two or more. These resins may be used in combination with the curing agents exemplified below.

The curing agent is not particularly limited, but may, for example, be an isocyanate curing agent. The isocyanate may be an aliphatic isocyanate or an aromatic isocyanate, among which the aliphatic isocyanate is preferred. The aliphatic isocyanate curing agent is a bifunctional or more isocyanate compound having no aromatic ring. The absence of aromatic ring contributes to preventing a benzene ring from being quinoidal due to ultraviolet rays, and also preventing or reducing yellowing, and thus such an isocyanate compound is suitable for an outermost layer such as a coating layer. As the aliphatic isocyanate curing agent, mention can be made of methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate, isopropylidene dicyclohexyl-4,4'-diisocyanate, or the like.

Of these materials, 1,6-hexamethylene diisocyanate and isophorone diisocyanate are preferred as the aliphatic isocyanate curing agent because electrolyte resistance is improved. In addition to improving the self-repairing ability of the curing agent, 1,6-hexamethylene diisocyanate is particularly preferred, from the perspective of developing good reactivity between the isocyanate groups in the curing agent and the hydroxyl groups contained in the acrylic resin and the polyester resin. By using such an aliphatic isocyanate curing agent, good mass production suitability is achieved.

Use of an adduct, a biuret, or an isocyanurate form of isocyanate as a curing agent can even more improve crosslinking density of the coating layer to be formed, and also achieve good alcohol resistance and electrolyte resistance.

The coating layer 18 preferably has a thickness in the range of 0.05 to 3 μm. If the coating layer 18 has a thickness of 0.05 μm or more, sufficient adhesion with an acrylic PSA tape is easily obtained. If the coating layer 18 has a thickness of 3 μm or less, lowering of drawing properties are easily prevented even in the presence of the coating layer.

[Method of Producing Packaging Material]

A method of producing the packaging material 10 will be described. The method of producing the packaging material 10 is not limited to the following method.

For example, the method of producing the packaging material 10 may be a method including the following steps S11 to S14. Step S11: Forming the anticorrosion treatment layer 15a on a surface of a metal foil layer 14 and forming the corrosion inhibition treatment layer 15b on the other surface of the metal foil layer 14.

Step S12: Forming the adhesion enhancement layer 12 on a surface of the substrate layer 11 to obtain a laminate. Step S13: Bonding a surface of the anticorrosion treatment layer 15a on a side opposite of the metal foil layer 14 to the adhesion enhancement layer 12 side surface of the laminate via the adhesive layer 13.

Step S14: Forming the sealant layer 17 on a surface of the anticorrosion treatment layer 15b on a side opposite of the metal foil layer 14 via the sealant adhesive layer 16.

Step S15: Forming the coating layer 18 on a surface of the substrate layer 11 on a side opposite of the adhesion enhancement layer 12.

(Step S11)

At step S11, the anticorrosion treatment layer 15a is formed on a surface of the metal foil layer 14 and the anticorrosion treatment layer 15b is formed on the other surface of the metal foil layer 14. The anticorrosion treatment layers 15a and 15b may be formed separately or simultaneously. Specifically, for example, an anticorrosion treatment agent (base material of the anticorrosion treatment layers) is applied to both surfaces of the metal foil layer 14, followed by drying, curing, and baking sequentially to simultaneously form the anticorrosion treatment layers 15a and 15b. Alternatively, an anticorrosion treatment agent may be applied to a surface of the metal foil layer 14, sequentially followed by drying, curing, and baking to form the anticorrosion treatment layer 15a. Then, the anticorrosion treatment layer 15b may be similarly formed on the other surface of the metal foil layer 14. The order of forming the anticorrosion treatment layers 15a and 15b is not particularly limited. The anticorrosion treatment agent to be used may be different or the same between the anticorrosion treatment layers 15a and 15b. As the anticorrosion treatment agent, for example, one for coating type chromate treatment, or the like may be used. Examples of the method of applying the anticorrosion treatment include, but are not particularly limited to, gravure coating, gravure reverse coating, roll coating, reverse roll coating, die coating, bar coating, kiss coating, and comma coating. As the metal foil layer 14, an untreated metal foil layer may be used, or a metal foil layer subjected to wet or dry degreasing treatment may be used.

(Step S12)

At step S12, the adhesion enhancement layer 12 is formed on a surface of the substrate layer 11. A method of forming the adhesion enhancement layer 12 will be described herein taking in-line coating as an example. First, an aqueous coating liquid is prepared which contains a dispersion where the above resin serving as a main component of the adhesion enhancement layer 12 is dispersed with a dispersant. Then, the aqueous coating liquid is applied to a surface of a thermoplastic resin film (base material of the substrate layer 11) before completion of the crystalline orientation. Then, the applied aqueous coating liquid is dried and then the thermoplastic resin film is stretched at least in a uniaxial direction.

Then, the orientation of the thermoplastic resin film is completed by heat treatment to obtain a laminate with the adhesion enhancement layer 12 formed on a surface of the substrate layer 11. The adhesion enhancement layer 12 formed using such in-line coating improves adhesion between the substrate layer 11 and the adhesion enhancement layer 12. The method of forming the adhesion enhancement layer 12 is not limited to the above method but any method may be used. In addition, the timing to form the adhesion enhancement layer 12 is not limited to one used in the present embodiment.

(Step S13)

At step S13, a surface of the anticorrosion treatment layer 15a on a side opposite of the metal foil layer 14 is bonded to the adhesion enhancement layer 12 side surface of the laminate by dry lamination or the like using an adhesive forming the adhesive layer 13. At step S13, aging treatment may be performed at a temperature in the range of room temperature to 100° C. to accelerate adhesion. Aging time is, for example, 1 to 10 days.

(Step S14)

Following step S13, the sealant layer 17 is formed, via the sealant adhesive layer 16, on a surface of the anticorrosion treatment layer 15b on a side opposite to the metal foil layer 14, in the laminate having the substrate layer 11, the adhesion enhancement layer 12, the adhesive layer 13, the anticorrosion treatment layer 15a, the metal foil layer 14, and the anticorrosion treatment layer 15b laminated in this order. The sealant layer 17 may be laminated by dry lamination, sandwich lamination, or the like, or may be laminated together with the sealant adhesive layer 16 by coextrusion. To improve adhesion, the sealant layer 17 is preferably laminated by, for example, sandwich lamination or laminated together with the sealant adhesive layer 16 by coextrusion, and is more preferably laminated by sandwich lamination.

(Step S15)

Following step S14, the coating layer 18 is formed on a surface of the substrate layer 11 on a side opposite of the adhesion enhancement layer 12, in the laminate having the substrate layer 11, the adhesion enhancement layer 12, the adhesive layer 13, the anticorrosion treatment layer 15a, the metal foil layer 14, the anticorrosion treatment layer 15b, the sealant adhesive layer 16, and the sealant layer 17 laminated in this order. Examples of the forming method include, but are not particularly limited to, gravure coating, gravure reverse coating, roll coating, reverse roll coating, die coating, bar coating, kiss coating, and comma coating.

The packaging material 10 is obtained through the steps S11 to S15 described above. The order of steps in the method of producing the packaging material 10 is not limited to that of the above method where steps S11 to S15 are sequentially performed. The order of steps may be appropriately changed. For example, step S12 may be followed by step S11.

[Power Storage Device]

A power storage device provided with the packaging material 10 as a container will be described. The power storage device includes: a battery element 1 including electrodes; leads 2 extending from the electrodes; and a container sandwiching the leads 2 and holding the battery element 1. The container is formed of the packaging material 10 for a power storage device, with the sealant layer 17 inside. The container may be obtained by overlapping two packaging materials with the sealant layers 17 face-to-face, and heat-sealing the edge portions of the overlapped packaging materials 10, or may be obtained by folding a single packaging material so that the surfaces are overlapped with each other and similarly heat-sealing the edge portions of the packaging material 10. The power storage device may have the packaging material 10 as a container. Examples of the power storage device include secondary batteries, such as lithium ion batteries, nickel hydride batteries, and lead batteries, and electrochemical capacitors, such as electric double layer capacitors.

The leads 2 are sandwiched and hermetically sealed by the packaging material 10 forming the container with the sealant layer 17 inside. The leads 2 may be sandwiched by the packaging material 10 via a tab sealant.

[Method of Producing Power Storage Device]

Figure 2A:
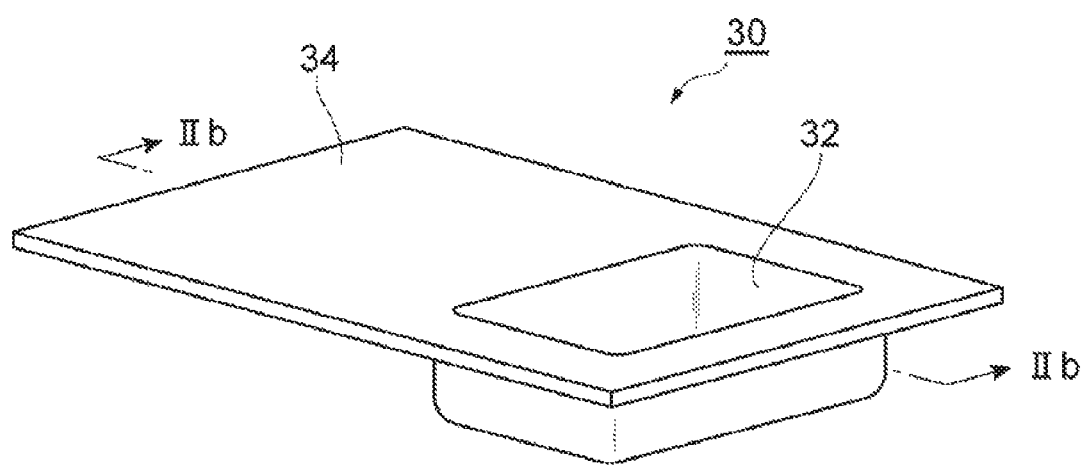
FIGS. 2A and 2B include a set of diagrams illustrating an embossed packaging material obtained using the power storage device packaging material according to an embodiment of the present invention, with FIG. 2A being a perspective view of the embossed packaging material, and FIG. 2B being a vertical cross-sectional view of the embossed packaging material shown in FIG. 2A taken along the line b-b.
Figure 2B:
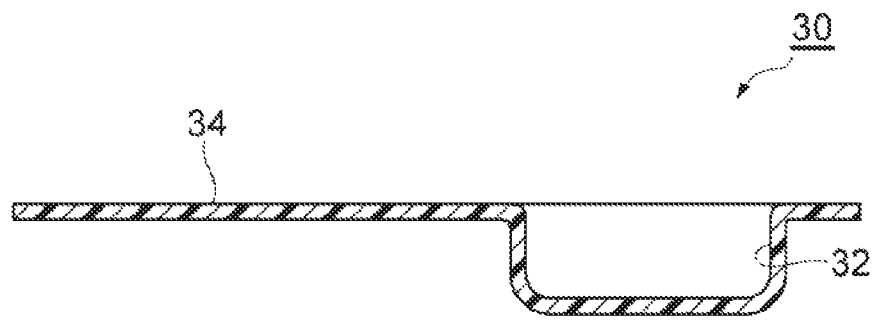

A method of producing the power storage device using the packaging material 10 will be described. The description herein is given taking as an example the case of producing a secondary battery 40 using an embossed packaging material 30. FIGS. 2A and 2B show a set of diagrams each illustrating the embossed packaging material 30. FIGS. 3A, 3B, 3C, and 3D show a set of diagrams, each being a perspective view of a production procedure of a single-sided battery using the packaging material 10. The secondary battery 40 may be a double-sided battery produced by providing two packaging materials similar to the embossed packaging material 30, and bonding the packaging materials to each other while alignment is adjusted. The embossed packaging material 30 may be formed using a packaging material 20.

The secondary battery 40, which is a single-sided battery, can be produced through steps S21 to S25 below, for example.

Step S21: Preparing the packaging material 10, the battery element 1 including electrodes, and the leads 2 extending from the electrodes.

Step S22: Forming a shaped area (recess 32) for disposing the battery element 1 therein on a surface of the packaging material 10 (see FIG. 3A and FIG. 3B).

Figure 3A:
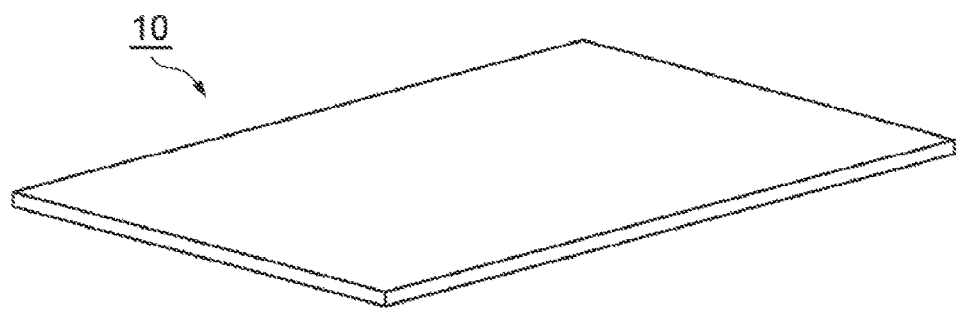
FIGS. 3A, 3B, 3C, and 3D include a set of perspective views illustrating a process of producing a secondary battery using the power storage device packaging material according to an embodiment of the present invention, with FIG. 3A showing the power storage device packaging material, FIG. 3B showing the power storage device packaging material that has been embossed, and a battery element, FIG. 3C showing the power storage device packaging material that has been folded with an end portion being heat-sealed, and FIG. 3D showing a state in which both sides of the folded portion are turned up.
Figure 3B:
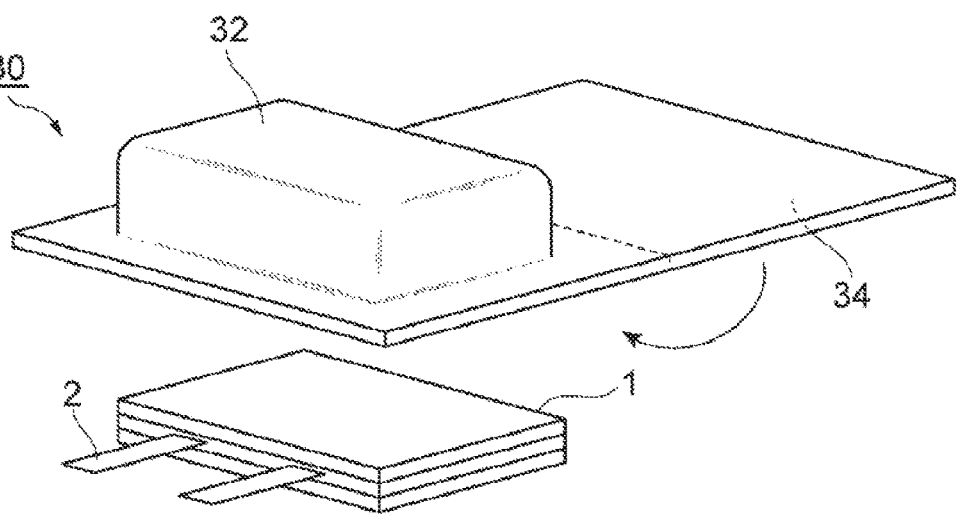
Figure 3C:
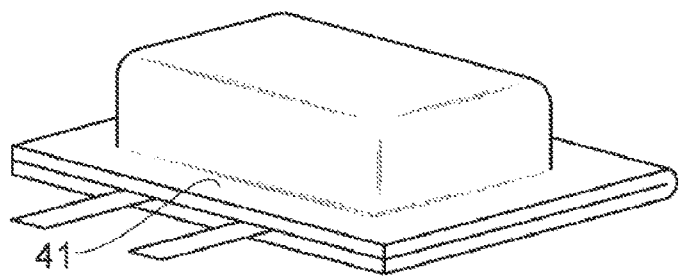
Figure 3D:
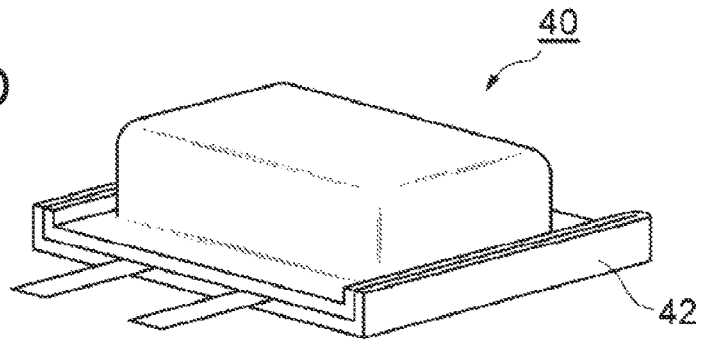

Step S23: Disposing the battery element 1 in the shaped area (recess 32) of the embossed packaging material 30, folding the embossed packaging material 30, with the surfaces being overlapped, so as to cover the recess 32 with a cover portion 34, and pressure heat-sealing one side of the embossed packaging material 30 so as to sandwich the leads 2 extending from the battery element 1 (FIG. 3B and FIG. 3C).

Step S24: Pressure heat-sealing other sides, leaving the side sandwiching the leads 2 unsealed, followed by injecting an electrolyte solution from the unsealed side and pressure heat-sealing the unsealed side in a vacuum (see FIG. 3C).

Step S25: Trimming the end portions of the pressure heat-sealed sides except for the side sandwiching the leads 2, and bending the end portions toward the shaped area (recess 32) (see FIG. 3D).

(Step S21)

At step S21, the packaging material 10, the battery element 1 including electrodes, and the leads 2 extending from the electrodes are prepared. The packaging material 10 is prepared based on the embodiment described above. The battery element 1 and the leads 2 are not particularly limited, but a known battery element 1 and known leads 2 may be used.

(Step S22)

At step S22, the recess 32 for arranging the battery element 1 is formed on the sealant layer 17 side of the packaging material 10. The recess 32 has a shape, such as a rectangular shape in plan view, conforming to the shape of the battery element 1. The recess 32 is formed by, for example, pressing a pressing member having a rectangular pressing surface against part of the packaging material 10 in the thickness direction thereof. The position to be pressed, that is, the recess 32 is formed in a position deviated to an end portion of the packaging material 10 in a longitudinal direction from the center of the packaging material 10 cut in a rectangle. Thus, the other end portion having no recess 32 is folded after forming to provide a cover (cover portion 34).

More specifically, the method of forming the recess 32 may be a method using a die (deep drawing). The molding method may be one that uses a negative die and a positive die arranged with a gap equal to or greater than the thickness of the packaging material 10 therebetween, so that the positive die is pressed into the negative die together with the packaging material 10. By adjusting pressing of the positive die, the depth (deep drawing degree) of the recess 32 can be adjusted as desired. With the recess 32 being formed in the packaging material 10, the embossed packaging material 30 is obtained. The embossed packaging material 30 has a shape, for example, as illustrated in FIGS. 2A and 2B. FIG. 2A shows a perspective view of the embossed packaging material 30, and FIG. 2B is a longitudinal cross-sectional view of the embossed packaging material 30 shown in FIG. 2A taken along the line b-b.

(Step S23)

At step S23, the battery element 1 including a cathode, a separator, an anode, and the like is arranged in the shaped area (recess 32) of the embossed packaging material 30. The leads 2 extending from the battery element 1 and respectively joined to the cathode and the anode are drawn out of the molding area (recess 32). The embossed packaging material 30 is then folded at the approximate center thereof in the longitudinal direction so that the surfaces of the sealant layer 17 are located on the inward side and overlapped with each other, followed by pressure heat-sealing the side of the embossed packaging material 30 sandwiching the leads 2. The pressure heat sealing is controlled by three conditions of temperature, pressure, and time, which are appropriately set. The pressure heat sealing is preferably performed at a temperature of not less than the temperature of fusing the sealant layer 17.

The thickness of the sealant layer 17 before being heat-sealed is preferably in the range of 40% to 80% relative to the thickness of the leads 2. With the thickness of the sealant layer 17 being not less than the lower limit, the heat-sealing resin is likely to sufficiently fill the end portions of the leads 2. With the thickness of the sealant layer 17 being not more than the upper limit, the thickness of the end portions of the packaging material 10 of the secondary battery 40 can have a moderate thickness, reducing the amount of moisture penetrating from the end portions of the packaging material 10.

(Step S24)

At step S24, the sides of the packaging material are pressure heat-sealed, leaving the side sandwiching the leads 2 unsealed. An electrolyte is then injected from the unsealed side which is then pressure heat-sealed in vacuum. The pressure heat-sealing conditions are similar to those at step S23.

(Step S25)

The end portions of the pressure heat-sealed sides except for the side sandwiching the leads 2 are trimmed and the sealant layer 17 squeezed out of the end portions is removed. The peripheral pressure heat-sealed portions are then turned up toward the shaped area (recess 32) to form turn-up portions 42, thereby obtaining the secondary battery 40.

Second Embodiment

[Power Storage Device Packaging Material]

The description in the first embodiment is applied mutatis mutandis to the description of a packaging material for a power storage device of the present embodiment. FIG. 1 is a schematic cross-sectional view illustrating a packaging material for a power storage device of the present embodiment. The present embodiment is given to show good deep drawing formability exhibited particularly when a substrate layer is made of a polyester film and the polyester film has specific physical properties after heat treatment.

(Substrate Layer 11)

The substrate layer 11 imparts heat resistance and electrolyte resistance to the packaging material 10 to suppress possible occurrence of pinholes therein during processing or distribution. The heat resistance is effective in the pressure heat-sealing step, described later, performed during production of the power storage device. The electrolyte resistance is effective against electrolyte leakage from other power storage devices. The substrate layer 11 is made of a polyester film exhibiting $\Delta A$, expressed by Formula (1) below, of 12% or more and having a 50% elongation stress (F50 stress value) of 75 MPa or more after heat treatment at 200° C.

$$\Delta A = \text{(break elongation after 200° C. heat treatment)} - \text{(break elongation after 160° C. heat treatment)} \quad (1)$$

In the present embodiment, the break elongation and the 50% elongation stress are defined as follows. That is, substrate layers each cut into an A4 size are heated for 30 minutes in an oven kept at a selected heat treatment temperature (160° C. or 200° C.). After that, tensile tests (test piece shape: dumbbell No. 5 according to JIS K7127, length between chucks: 75 mm, gauge length: 25 mm, test speed: 50 mm/min) are performed in four directions (0° (MD), 45°, 90° (TD), 135°) of the substrate layer at 23° C. (room temperature). Measurements in the four directions are then averaged to calculate break elongation and 50% elongation stress of the present embodiment. The break elongation is calculated as follows.

$$\text{Break elongation}(\%) = \{(\text{Gauge length at break} - \text{Gauge length before measurement})/\text{Gauge length before measurement}\} \times 100$$

It should be noted that longitudinal and transverse directions of the substrate layer are respectively in agreement with MD (mechanical feed direction) and TD (direction vertical to MD) of an original material of the substrate layer. Specifically, when the substrate layer 11 is made of a biaxially stretched film, the longitudinal and transverse directions of a test piece each should agree with either one of the two stretching directions of the film.

A packaging material 10 exhibiting $\Delta A$ of 12% or more is less likely to break, even when the substrate layer 11 is in a state of being easily drawn greatly with a smaller force due to the heat of the heat treatment, and enables deep drawing after heat treatment as well. From this perspective, $\Delta A$ is preferably 14% or more and more preferably 16% or more. $\Delta A$ may have an upper limit, but is not particularly limited to, of approximately 100%. This is because when the substrate layer 11 is in a state of being easily drawn and the 50% elongation stress is too small, the substrate 11 is unlikely to protect the metal foil layer 14 from the forming stress.

A packaging material 10 having a 50% elongation stress of 75 MPa or more after heat treatment at 200° C. can disperse a local force applied to the packaging material 10 and prevent breakage of the metal foil layer 14 due to deep drawing. From this perspective, the 50% elongation stress is preferably 80 MPa or more and more preferably 85 MPa or more. The 50% elongation stress may have an upper limit, but is not particularly limited to, of approximately 250 MPa from the perspective of being used after being formed.

The description in the first embodiment is applied mutatis mutandis to the rest of the description of the substrate layer 11.

The description in the first embodiment is applied mutatis mutandis to the description of the adhesion enhancement layer 12, the adhesive layer 13, the metal foil layer 14, the anticorrosion treatment layers 15a and 15b, the sealant adhesive layer 16, the sealant layer 17, and the coating layer 18.

[Method of Producing Packaging Material, Power Storage Device, and Method of Producing Power Storage Device]

The description in the first embodiment is applied mutatis mutandis to the description of these issues.

Third Embodiment

[Power Storage Device Packaging Material]

The description in the first embodiment is applied mutatis mutandis to the description of a packaging material for a power storage device of the present embodiment. FIG. 1 is a schematic cross-sectional view illustrating a packaging material for a power storage device of the present embodiment. The present embodiment is given to show good deep drawing formability exhibited particularly by specific layers with a specific thickness ratio, in the case where the substrate layer is made of a polyester film and the metal foil layer is aluminum foil provided with an anticorrosion treatment layer on at least a surface thereof.

That is, a packaging material in the present embodiment includes a structure at least having a substrate layer, an adhesive layer, a metal foil layer, a sealant adhesive layer, and a sealant layer laminated in this order. The substrate layer is made of a polyester film. The metal foil layer is aluminum foil provided with an anticorrosion treatment layer on at least a surface thereof. The thickness ratio of the substrate layer to the metal foil layer (substrate layer thickness/metal foil layer thickness) is in the range of 0.25 to 1.00. Such a packaging material can exhibit good deep drawing formability.

In the packaging material of the present embodiment, the thickness ratio of the substrate layer to the sealant layer (substrate layer thickness/sealant layer thickness) is preferably in the range of 0.10 to 0.35. The ratio in this range not only imparts good deep drawing formability to the package material, but also sufficiently reduces curling of the packaging material.

(Substrate Layer 11)

The substrate layer 11 is made of a polyester film. The description in the first embodiment is applied mutatis mutandis to a specific mode of the substrate layer 11. The polyester film may be one described in the first or second embodiment, which exhibits specific physical properties after heat treatment, leading to exhibiting much better deep drawing formability. In the present embodiment, such a polyester film having specific physical properties after heat treatment does not have to be necessarily used.

(Metal Foil Layer 14)

In the present embodiment, the metal foil layer 14 is aluminum foil and the thickness ratio of the substrate layer 11 to the metal foil layer 14 (substrate layer thickness/metal foil layer thickness) is in the range of 0.25 to 1.00. The ratio in this range allows the packaging material to exhibit good deep drawing formability.

To secure the above thickness ratio to the substrate layer 11, the metal foil layer 14 preferably has a thickness of 9 µm or more, and more preferably 15 µm or more, in terms of the barrier properties and the pinhole resistance. The metal foil layer 14 with a thickness of 9 µm or more may be able to make the layer less breakable even when stress is applied thereto by molding. The metal foil layer 14 with a thickness of 50 µm or less may be able to curb the increase in mass of the packaging material and minimize the decrease in weight energy density of the power storage device.

Typical idea of preventing breaking of aluminum foil during forming has been to make the substrate layer thicker than the metal foil layer to rely on the flexibility of the substrate layer. However, this structure is likely to cause curling in the packaging material if the substrate layer is formed of a single layer of a polyester film. Accordingly, in the present embodiment, the thickness ratio of the substrate layer to the metal foil layer is specified as above to maintain good formability, in addition to preventing curling. The advantageous effects of this specification are prominently exhibited when the substrate layer has a small thickness in the range of 6 to 25 µm and particularly 9 to 16 µm approximately, and is likely to cause greater curling.

The description in the first embodiment is applied mutatis mutandis to the rest of the description of the metal foil layer 14.

(Sealant Layer 17)

In the present embodiment, the thickness ratio of the substrate layer 11 to the sealant layer 17 (substrate layer thickness/sealant layer thickness) is preferably in the range of 0.10 to 0.35. The ratio in this range not only imparts good deep drawing formability to the package material, but also sufficiently reduces curling of the packaging material.

To preferably secure the above thickness ratio to the substrate layer 11, the sealant layer 17 preferably has a thickness in the range of 10 to 100 µm and more preferably 20 to 60 µm. The sealant layer 17 with a thickness of 10 µm or more achieves sufficient heat sealing strength. The sealant layer 17 with a thickness of 100 µm or less reduces the amount of water vapor penetration from an end of the packaging material.

The description in the first embodiment is applied mutatis mutandis to the rest of the description of the sealant layer 17.

The description in the first embodiment is applied mutatis mutandis to the description of the adhesion enhancement layer 12, the adhesive layer 13, the anticorrosion treatment layers 15a and 15b, the sealant adhesive layer 16, and the coating layer 18.

The packaging material 10 for a power storage device of the present embodiment including layers from the substrate layer 11 to the coating layer 18 may have a thickness (total thickness) in the range of 50 to 160 µm but is not particularly limited to this.

[Method of Producing Packaging Material, Power Storage Device, and Method of Producing Power Storage Device]

The description in the first embodiment is applied mutatis mutandis to the description of these issues.

Preferred embodiments of the method of producing the power storage device packaging material and the method of producing the power storage device of the present invention have so far been described in detail. However, the present invention should not be construed as being limited to these specific embodiments, but may be variously modified and changed within the range of the spirit of the present invention recited in the claims.

EXAMPLES

In the following, the present invention will be described in more detail by way of examples. However, the present invention should not be limited to the following examples.

<First Arrangement>

(Preparation of Substrate Layer)

As the substrate layer 11, polyester films having the properties shown in Table 1 (all have a thickness of 25 μm) were used. In Table 1, 50% elongation stress and thermal shrinkage were measured as follows.

50% elongation stress (F50 stress): Polyester films each cut into an A4 size were heated for 30 minutes in an oven kept at a selected heat treatment temperature in the range of 160° C. to 200° C. After that, tensile tests (test piece shape: dumbbell No. 5 according to JIS K7127, length between chucks: 75 mm, gauge length: 25 mm, test speed: 50 mm/min, temperature: 23° C.) were performed in four directions (0° (MD), 45°, 90° (TD), 135°) of the polyester film. Measurements in four directions were then averaged to calculate 50% elongation stress.

Thermal shrinkage: Polyester films each cut into an A4 size at 23° C. were heated for 30 minutes in an oven kept at a selected heat treatment temperature in the range of 160° C. to 200° C. After that, lengths of the polyester film in four directions (0° (MD), 45°, 90° (TD), 135°) at 23° C. were measured. Then, thermal shrinkages in respective directions were calculated using the following formula to obtain an average of them.

Thermal shrinkage(%)=[{Length in each direction (A4 size)measured before heat treatment− Length in each direction measured after heat treatment}/Length in each direction measured before heat treatment]×100

TABLE 1

| | 50% Elongation Stress (MPa) | | | Thermal Shrinkage (%) | | | Coating Layer | |
| --- | --- | --- | --- | --- | --- | --- | --- | --- |
| | Heat Treatment Temperature | | | | | | | Thickness |
| | 160° C. | 180° C. | 200° C. | 160° C. | 180° C. | 200° C. | Material | (μm) |
| Comparative Example 1-1 | 103.8 | — | — | 16.0 | — | — | — | — |
| Comparative Example 1-2 | 90.3 | — | — | 16.0 | — | — | — | — |
| Comparative Example 1-3 | 116.7 | 107.6 | 98.1 | 16.0 | 20.4 | 24.4 | — | — |
| Comparative Example 1-4 | 126.9 | 116.4 | 103.7 | 12.8 | 17.8 | 22.1 | — | — |
| Comparative Example 1-5 | 133.7 | 121.6 | 107.3 | 8.0 | 13.3 | 18.4 | — | — |
| Example 1-1 | 147.6 | 139.2 | 118.8 | 3.9 | 8.4 | 14.2 | — | — |
| Example 1-2 | 144.7 | 144.0 | 130.2 | 1.5 | 3.4 | 7.8 | — | — |
| Comparative Example 1-6 | 148.4 | 130.7 | 118.3 | 0.9 | 1.3 | 2.4 | — | — |
| Example 1-3 | 147.6 | 139.2 | 118.8 | 3.9 | 8.4 | 14.2 | — | — |
| Example 1-4 | 147.6 | 139.2 | 118.8 | 3.9 | 8.4 | 14.2 | — | — |
| Comparative Example 1-7 | 103.8 | — | — | 16.0 | — | — | Polyester-based Resin | 1.0 |
| Comparative Example 1-8 | 90.3 | — | — | 16.0 | — | — | Polyester-based Resin | 1.0 |
| Comparative Example 1-9 | 116.7 | 107.6 | 98.1 | 16.0 | 20.4 | 24.4 | Polyester-based Resin | 1.0 |
| Comparative Example 1-10 | 126.9 | 116.4 | 103.7 | 12.8 | 17.8 | 22.1 | Polyester-based Resin | 1.0 |
| Comparative Example 1-11 | 133.7 | 121.6 | 107.3 | 8.0 | 13.3 | 18.4 | Polyester-based Resin | 1.0 |
| Example 1-5 | 147.6 | 139.2 | 118.8 | 3.9 | 8.4 | 14.2 | Polyester-based Resin | 1.0 |
| Example 1-6 | 144.7 | 144.0 | 130.2 | 1.5 | 3.4 | 7.8 | Polyester-based Resin | 1.0 |
| Comparative Example 1-12 | 148.4 | 130.7 | 118.3 | 0.9 | 1.3 | 2.4 | Polyester-based Resin | 1.0 |
| Example 1-7 | 147.6 | 139.2 | 118.8 | 3.9 | 8.4 | 14.2 | Polyester-based Resin | 1.0 |
| Example 1-8 | 147.6 | 139.2 | 118.8 | 3.9 | 8.4 | 14.2 | Polyester-based Resin | 1.0 |
| Comparative Example 1-13 | 103.8 | — | — | 16.0 | — | — | Acrylic Resin | 1.0 |
| Comparative Example 1-14 | 90.3 | — | — | 16.0 | — | — | Acrylic Resin | 1.0 |
| Comparative Example 1-15 | 116.7 | 107.6 | 98.1 | 16.0 | 20.4 | 24.4 | Acrylic Resin | 1.0 |
| Comparative Example 1-16 | 126.9 | 116.4 | 103.7 | 12.8 | 17.8 | 22.1 | Acrylic Resin | 1.0 |
| Comparative Example 1-17 | 133.7 | 121.6 | 107.3 | 8.0 | 13.3 | 18.4 | Acrylic Resin | 1.0 |
| Example 1-9 | 147.6 | 139.2 | 118.8 | 3.9 | 8.4 | 14.2 | Acrylic Resin | 1.0 |
| Example 1-10 | 144.7 | 144.0 | 130.2 | 1.5 | 3.4 | 7.8 | Acrylic Resin | 1.0 |
| Comparative Example 1-18 | 148.4 | 130.7 | 118.3 | 0.9 | 1.3 | 2.4 | Acrylic Resin | 1.0 |

TABLE 1-continued

| | 50% Elongation Stress (MPa) | | | Thermal Shrinkage (%) | | | Coating Layer | |
|---|---|---|---|---|---|---|---|---|
| | Heat Treatment Temperature | | | | | | | Thickness |
| | 160° C. | 180° C. | 200° C. | 160° C. | 180° C. | 200° C. | Material | (μm) |
| Example 1-11 | 147.6 | 139.2 | 118.8 | 3.9 | 8.4 | 14.2 | Acrylic Resin | 1.0 |
| Example 1-12 | 147.6 | 139.2 | 118.8 | 3.9 | 8.4 | 14.2 | Acrylic Resin | 1.0 |
| Reference Example 1-1 | 147.6 | 139.2 | 118.8 | 3.9 | 8.4 | 14.2 | Polyester-based Resin | 4.0 |
| Reference Example 1-2 | 147.6 | 139.2 | 118.8 | 3.9 | 8.4 | 14.2 | Acrylic Resin | 4.0 |

Example 1-1

As the metal foil layer 14, soft aluminum foil 8079 having a thickness of 40 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and successively baked to form the anticorrosion treatment layer 15a on a surface of the metal foil treatment 14 and the anticorrosion treatment layer 15b on the other surface. The sol was baked at a temperature of 150° C. and for a treatment time of 30 seconds.

Then, a surface of each polyester film shown in Table 1, serving as the substrate layer 11, was corona-treated.

Then, a polyurethane-based adhesive was applied, as the adhesive layer 13, to a surface of the anticorrosion treatment layer 15a of the metal foil layer 14, on a side opposite of the metal foil layer 14. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in an atmospheric air at 60° C. temperature for 6 days for aging treatment.

Then, the sealant adhesive layer 16 was formed by extruding maleic anhydride modified polypropylene (Trade name: ADMER, manufactured by Mitsui Chemicals, Inc.) serving a base material of the sealant adhesive layer 16. The sealant adhesive layer 16 was ensured to have a thickness of 15 μm. Then, a polyolefin film with a thickness of 30 μm (non-stretched polypropylene film having a sealant adhesive layer 16 side corona-treated surface) serving as the sealant layer 17 was bonded (heat-pressure bonded) to the anticorrosion treatment layer 15b at 160° C. via the sealant adhesive layer 16 by sandwich lamination using a heat lamination apparatus. The resultant film was taken up to prepare a packaging material 10 for a power storage device in a roll.

Example 1-2, Comparative Examples 1-1 to 1-6

Packaging materials 10 for a power storage device were prepared in the same manner as in Example 1-1 except for using the polyester films shown in Table 1.

Example 1-3

A packaging material 10 for a power storage device was prepared in the same manner as in Example 1-1 except that the adhesion enhancement layer 12 was formed on the adhesive layer 13 side surface of the substrate layer 11 instead of corona-treating the surface of the substrate layer 11. A coating agent, which was prepared as follows, serving as a base material of the adhesion enhancement layer 12 was applied to a surface of the substrate layer 11 by in-line coating so as to have a solid content of 0.1 g/m², followed by drying, thereby forming an adhesion enhancement layer 12. The adhesion enhancement layer 12 had a thickness of approximately 0.1 μm.

(Preparation of Coating Agent for Forming Adhesion Enhancement Layer)

The coating agent for forming an adhesion enhancement layer was prepared with the following formulation.

Coating agent: Self-emulsifying polyisocyanate "Aquanate 100", manufactured by Nippon Polyurethane Industry Co., Ltd., and spherical silica microparticles "Seahostar KE-P30" (average particle size of 0.3 μm), manufactured by Nippon Shokubai Co., Ltd., were added to a water-soluble polyester "Aron Melt PES-1000", manufactured by Toagosei Co., Ltd., at a formulation ratio (mass ratio) of 95/5/0.5 and diluted with water.

Example 1-4

A packaging material 10 for a power storage device was prepared in the same manner as in Example 1-1 except that the anticorrosion treatment layers 15a and 15b were formed by chromate treatment instead of forming them using the sodium polyphosphate stabilized cerium oxide sol. The chromate treatment was performed by applying a treatment liquid, which contained a phenolic resin, a chromium fluoride compound, and phosphoric acid, onto both surfaces of the metal foil layer 14 to form a coating, followed by baking.

Examples 1-5 to 1-8, Comparative Examples 1-7 to 1-12

Packaging materials 10 for a power storage device were respectively prepared in the same manner as in Examples 1-1 to 1-4 and Comparative Examples 1-1 to 1-6 except that a coating layer made of a polyester-based resin with a thickness of 1.0 μm was formed on the substrate layer 11 by applying a resin composition, which was formulated by adding an isocyanurate form of IPDI as a curing agent to polyester polyol, onto the substrate layer 11, followed by heating and curing.

Examples 1-9 to 1-12, Comparative Examples 1-13 to 1-18

Packaging materials 10 for a power storage device were respectively prepared in the same manner as in Examples 1-1 to 1-4 and Comparative Examples 1-1 to 1-6, except that a coating layer made of an acrylic resin with a thickness of 1.0 μm was formed on the substrate layer 11 by applying a resin composition, which was formulated by adding an adduct form of HDI as a curing agent to acrylic polyol, onto the substrate layer 11, followed by heating and curing.

Reference Examples 1-1 and 1-2

Packaging materials 10 for a power storage device were respectively prepared in the same manner as in Examples 1-5 and 1-9, except that the thickness of the coating layer was changed to 4.0 μm.

<Evaluation on Processability>

The sealant layer 17 was bonded to the anticorrosion treatment layer 15b via the sealant adhesive layer 16 by sandwich lamination using a heat lamination apparatus. The films obtained in this way were evaluated according to the following criteria, as to the processability when being taken up.

A: Processability was good both in bonding and take-up.
B: Processability was poor either in bonding or take-up.
C: Processability was very poor both in bonding and take-up.

<Evaluation on Drawing Depth>

For the packaging materials 10 for a power storage device produced in Examples and Comparative Examples, drawing depth of deep drawing was evaluated by the following method. First, each packaging material 10 for a power storage device was arranged in a forming apparatus with the sealant layer 17 facing upward. Forming depth of the forming apparatus was set to 6.0 mm or 6.5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material 10 with light to thereby evaluate the maximum value (forming limit) of the drawing depth by the following criteria. The results are shown in Table 2.

A: Neither breakage nor pinholes were observed at 6.5 mm drawing depth.
B: Breakage or pinholes were observed at 6.5 mm drawing depth, but neither breakage nor pinholes were observed at 6.0 mm drawing depth.
C: Breakage or pinholes were observed at 6.0 mm drawing depth.

<Evaluation on Interlayer Adhesion>

For the packaging materials 10 for a power storage device produced in Examples and Comparative Examples, adhesion between the substrate layer 11 and the metal foil layer 14 was evaluated using the following method. First, each packaging material 10 for a power storage device was arranged in a forming apparatus, with the sealant layer 17 facing upward. The forming depth of the forming apparatus was set to 5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD).

Then, the cold-formed packaging material 10 was placed in a 100 mL capacity beaker containing 30 mL of 1 M lithium hexafluorophosphate solution (solvent volume ratio=ethyl carbonate:dimethyl carbonate:dimethyl carbonate=1:1:1). Then, the beaker containing the packaging material 10 was sealed in an 18 L can and left standing in an environment of 40° C. temperature for 2 hours to expose the packaging material 10 to the electrolyte. After that, the packaging material 10 was taken out of the beaker in the 18 L can and placed in a 110° C. oven, or in an environment of 60° C. temperature and 95% humidity, or in 50° C. hot water. Then, the presence/absence of separation between the substrate layer 11 and the metal foil layer 14 of the packaging material 10 was visually checked with time thereafter to thereby obtain the maximum value (unit: week) of the period during which no separation was observed between the substrate layer 11 and the metal foil layer 14. Based on the results, adhesion between the substrate layer 11 and the metal foil layer 14 was evaluated according to the following evaluation criteria. The results are shown in Table 2.

A: No separation was observed after 4 weeks.
B: Separation was observed after 4 weeks.

<PSA Tape Adhesion>

For the packaging materials 10 for a power storage device produced in Examples and Comparative Examples, adhesion between the substrate layer 11 (or coating layer 18) and an acrylic PSA tape was evaluated using the following method. First, the packaging material 10 for a power storage device was bonded to a support, with the substrate layer 11 (or coating layer 18) facing upward. Then, an acrylic PSA tape and support aluminum foil for separation test were bonded onto the substrate layer 11 (or coating layer 18) with approximately a 20 N force. After leaving them for approximately 1 hour, separation strength (180-degree separation, 50 mm/min separation rate) between the substrate layer 11 (or coating layer 18) and the acrylic PSA tape was measured, for evaluation according to the following evaluation criteria. The results are shown in Table 2.

○: Separation strength was 10 N/15 mm or more.
x: Separation strength was less than 10 N/15 mm.

TABLE 2

| | | | Interlayer Adhesion | | | |
|---|---|---|---|---|---|---|
| | Processability | Forming Limit | 110° C. | 60° C./95% | 50° C. Hot Water | PSA Tape Adhesion |
| Comparative Example 1-1 | C | A | A | A | A | x |
| Comparative Example 1-2 | C | A | A | A | A | x |
| Comparative Example 1-3 | C | A | A | A | A | x |

TABLE 2-continued

| | Processability | Forming Limit | Interlayer Adhesion | | | PSA Tape Adhesion |
| | | | 110° C. | 60° C./95% | 50° C. Hot Water | |
|---|---|---|---|---|---|---|
| Comparative Example 1-4 | B | A | A | A | A | x |
| Comparative Example 1-5 | B | A | A | A | A | x |
| Example 1-1 | A | B | A | A | A | x |
| Example 1-2 | A | B | A | A | A | x |
| Comparative Example 1-6 | A | C | A | A | A | x |
| Example 1-3 | A | B | A | A | A | x |
| Example 1-4 | A | B | A | A | B | x |
| Comparative Example 1-7 | C | A | A | A | A | ○ |
| Comparative Example 1-8 | C | A | A | A | A | ○ |
| Comparative Example 1-9 | C | A | A | A | A | ○ |
| Comparative Example 1-10 | B | A | A | A | A | ○ |
| Comparative Example 1-11 | B | A | A | A | A | ○ |
| Example 1-5 | A | B | A | A | A | ○ |
| Example 1-6 | A | B | A | A | A | ○ |
| Comparative Example 1-12 | A | C | A | A | A | ○ |
| Example 1-7 | A | B | A | A | A | ○ |
| Example 1-8 | A | B | A | A | B | ○ |
| Comparative Example 1-13 | C | A | A | A | A | ○ |
| Comparative Example 1-14 | C | A | A | A | A | ○ |
| Comparative Example 1-15 | C | A | A | A | A | ○ |
| Comparative Example 1-16 | B | A | A | A | A | ○ |
| Comparative Example 1-17 | B | A | A | A | A | ○ |
| Example 1-9 | A | B | A | A | A | ○ |
| Example 1-10 | A | B | A | A | A | ○ |
| Comparative Example 1-18 | A | C | A | A | A | ○ |
| Example 1-11 | A | B | A | A | A | ○ |
| Example 1-12 | A | B | A | A | B | ○ |
| Reference Example 1-1 | A | C | A | A | A | ○ |
| Reference Example 1-2 | A | C | A | A | A | ○ |

As will be understood from the results shown in Table 2, Examples of the present invention can each provide a packaging material for a power storage device having good processability during production and good deep drawing formability after production.

<Second Arrangement>
(Preparation of Substrate Layer)

As the substrate layer 11, polyester films having the properties shown in Table 3 (all have a thickness of 25 μm) were used. In Table 3, ΔA is a value expressed by Formula (1) below and $F50^{200°\ C.}$ indicates a 50% elongation stress after heat treatment.

$$\Delta A = (\text{break elongation after 200° C. heat treatment}) - (\text{break elongation after 160° C. heat treatment}) \quad (1)$$

Break elongation and 50% elongation stress were measured as follows. That is, the polyester films each cut into an A4 size were heated for 30 minutes in an oven kept at a selected heat treatment temperature (160° C. or 200° C.) and then tensile tests (test piece shape: dumbbell No. 5 according to JIS K7127, length between chucks: 75 mm, gauge length: 25 mm, test speed: 50 mm/min) were performed at 23° C. in four directions (0° (MD), 45°, 90° (TD), 135°) of the substrate layer. Measurements in the four directions were then averaged to calculate break elongation and 50% elongation stress in the present embodiment. It should be noted that the break elongation is calculated as follows.

Break elongation(%) = {(Gauge length at break − Gauge length before measurement)/Gauge length before measurement} × 100

TABLE 3

| | Polyester Film No. | Break Elongation [%] | | ΔA [%] | $F50^{200°\ C.}$ [MPa] |
| | | After 200° C. Heat Treatment | After 160° C. Heat Treatment | | |
|---|---|---|---|---|---|
| Example 2-1 | A-1 | 128.9 | 86.8 | 42.1 | 81.3 |
| Example 2-2 | A-2 | 116.9 | 85.1 | 31.8 | 94.1 |
| Example 2-3 | A-3 | 102.8 | 80.6 | 22.2 | 108.2 |
| Example 2-4 | A-4 | 87.0 | 70.0 | 17.0 | 156.2 |
| Example 2-5 | A-5 | 87.0 | 70.0 | 17.0 | 156.2 |

TABLE 3-continued

| | Polyester Film No. | Break Elongation [%] After 200° C. Heat Treatment | Break Elongation [%] After 160° C. Heat Treatment | ΔA [%] | $F50^{200° C.}$ [MPa] |
|---|---|---|---|---|---|
| Example 2-6 | A-6 | 100.7 | 87.2 | 13.5 | 84.7 |
| Example 2-7 | A-7 | 99.5 | 86.4 | 13.1 | 80.9 |
| Example 2-8 | A-8 | 85.1 | 72.4 | 12.7 | 143.2 |
| Example 2-9 | A-9 | 114.7 | 97.7 | 17.0 | 156.2 |
| Comparative Example 2-1 | A-10 | 198.7 | 131.0 | 67.7 | 71.5 |
| Comparative Example 2-2 | A-11 | 137.1 | 112.2 | 24.9 | 73.0 |
| Comparative Example 2-3 | A-12 | 112.7 | 102.3 | 10.4 | 151.3 |
| Comparative Example 2-4 | A-13 | 123.0 | 118.3 | 4.7 | 87.5 |
| Comparative Example 2-5 | A-14 | 126.0 | 115.9 | 10.1 | 72.4 |

(Preparation of Coating Agent for Forming Adhesion Enhancement Layer)

The coating agent for forming an adhesion enhancement layer was prepared with the following formulation.

Coating agent: Self-emulsifying polyisocyanate "Aquanate 100", manufactured by Nippon Polyurethane Industry Co., Ltd., and spherical silica microparticles "Seahostar KE-P30" (average particle size of 0.3 μm), manufactured by Nippon Shokubai Co., Ltd., were added to a water-soluble polyester "Aron Melt PES-1000", manufactured by Toagosei Co., Ltd., at a formulation ratio (mass ratio) of 95/5/0.5 and diluted with water.

Example 2-1

In Example 2-1, a packaging material 10 for a power storage device was prepared by the following method. As the metal foil layer 14, soft aluminum foil 8079 having a thickness of 40 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and successively baked to form the anticorrosion treatment layer 15a on a surface of the metal foil treatment 14 and the anticorrosion treatment layer 15b on the other surface. The sol was baked at a temperature of 150° C. and for a treatment time of 30 seconds.

Then, a surface of a polyester film A-1 serving as the substrate layer 11 was corona-treated.

Then, a polyurethane-based adhesive was applied, as the adhesive layer 13, to a surface of the anticorrosion treatment layer 15a of the metal foil layer 14, on a side opposite of the metal foil layer 14. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in an atmospheric air at 60° C. temperature for 6 days for aging treatment. After that, a total of three types of packaging materials 10 for a power storage device having a dry lamination structure or a heat lamination structure (160° C. or 200° C.) were prepared according to the adhesive component forming the sealant adhesive layer 16.

Dry Lamination Structure

A polyurethane-based adhesive serving as the sealant adhesive layer 16 was applied to a surface of the anticorrosion treatment layer 15b on a side opposite of the metal foil layer 14. The polyurethane-based adhesive was formulated by blending polyisocyanate into acid modified polyolefin that was dissolved in a mixed solvent of toluene and methylcyclohexane. Then, a polyolefin film with a thickness of 40 μm (non-stretched polypropylene film having a sealant adhesive layer 16 side corona-treated surface) serving as the sealant layer 17 was adhered to the metal foil layer 14 via the sealant adhesive layer 16 by dry lamination. After that, the structure made up of the substrate layer 11, the adhesive layer 13, the anticorrosion treatment layer 15a, the metal foil layer 14, the anticorrosion treatment layer 15b, the sealant adhesive layer 16, and the sealant layer 17 was left standing in an atmospheric air at 40° C. temperature for 6 days for aging treatment. A packaging material 10 for a power storage device was thus produced.

Heat Lamination Structure (160° C. or 200° C.)

The sealant adhesive layer 16 was formed by extruding maleic anhydride modified polypropylene (Trade name: ADMER, manufactured by Mitsui Chemicals, Inc.) serving a base material of the sealant adhesive layer 16. The sealant adhesive layer 16 was ensured to have a thickness of 15 μm. Then, a polyolefin film with a thickness of 30 μm (non-stretched polypropylene film having a sealant adhesive layer 16 side corona-treated surface) serving as the sealant layer 17 was adhered (heat-pressure bonded) to the anticorrosion treatment layer 15b at 160° C. or 200° C. via the sealant adhesive layer 16 by sandwich lamination instead of dry lamination. A packaging material 10 for a power storage device was thus produced.

Examples 2-2 to 2-4 and 2-6 to 2-8, Comparative Examples 2-1 to 2-5

Packaging materials 10 for a power storage device were prepared in the same manner as in Example 2-1 except for using the polyester films shown in Table 3 instead of using the polyester film A-1.

Example 2-5

A packaging material 10 for a power storage device was prepared in the same manner as in Example 2-1 except that the adhesion enhancement layer 12 was formed on the adhesive layer 13 side surface of the substrate layer 11 instead of corona-treating the surface of the substrate layer 11, and a polyester film A-5 was used instead of the polyester film A-1. A coating agent serving as a base material of the adhesion enhancement layer 12 was applied to a surface of the substrate layer 11 by in-line coating so as to have a solid content of 0.1 g/m², followed by drying, thereby forming an adhesion enhancement layer 12 with a thickness of approximately 0.1 μm.

Example 2-9

A packaging material 10 for a power storage device was prepared in the same manner as in Example 2-1 except that the anticorrosion treatment layers 15a and 15b were formed by chromate treatment instead of forming them using the sodium polyphosphate stabilized cerium oxide sol, and a polyester film A-9 was used instead of the polyester film A-1. The chromate treatment was performed by applying a treatment liquid, which contained a phenolic resin, a chromium fluoride compound, and phosphoric acid, onto both surfaces of the metal foil layer 14 to form a coating, followed by baking.

<Evaluation on Drawing Depth>

For the three types of packaging materials 10 for a power storage device produced in Examples and Comparative Examples, drawing depth of deep drawing was evaluated by the following method. First, each packaging material 10 for a power storage device was arranged in a forming apparatus, with the sealant layer 17 facing upward. Forming depth of the forming apparatus was set to a ratio of 3.5 to 7.0 mm per 0.5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material 10 with light to thereby obtain the maximum value (forming limit) of the drawing depth with which the packaging material was deep-drawn causing neither breakage nor pinholes. The results are shown in Table 4.

Then, the cold-formed packaging material 10 was placed in a 100 mL capacity beaker containing 30 mL of 1 M lithium hexafluorophosphate solution (solvent volume ratio=ethyl carbonate:dimethyl carbonate:dimethyl carbonate=1:1:1). Then, the beaker containing the packaging material 10 was sealed in an 18 L can and left standing in an environment of 40° C. temperature for 2 hours to expose the packaging material 10 to the electrolyte. After that, the packaging material 10 was taken out of the beaker in the 18 L can and placed in a 110° C. oven, or in an environment of 60° C. temperature and 95% humidity, or in 50° C. hot water. Then, the presence/absence of separation between the substrate layer 11 and the metal foil layer 14 of the packaging material 10 was visually checked after 1, 2, 3 and 4 weeks to thereby obtain the maximum value (unit: week) of the period during which no separation was observed between the substrate layer 11 and the metal foil layer 14. Based on the results, adhesion between the substrate layer 11 and the metal foil layer 14 was evaluated according to the following evaluation criteria. The results are shown in Table 4. For Comparative Examples 2-3 to 2-5 wherein forming limit was less than 5 mm, adhesion was not evaluated.

A: No separation was observed after 4 weeks.

B: No separation was observed after 3 weeks but was observed after 4 weeks.

TABLE 4

| | Adhesion Surface Treatment | Metal Foil Layer Surface Treatment | Forming Limit [mm] | | | Adhesion | | |
|---|---|---|---|---|---|---|---|---|
| | | | Dry Lamination | 160° C. Heat | 200° C. Heat | 110° C. | 60° C. 95% | 50° C. Hot Water |
| Example 2-1 | Corona | Cerium Oxide | 6.0 | 6.0 | 6.0 | A | A | A |
| Example 2-2 | Corona | Cerium Oxide | 6.0 | 6.0 | 6.0 | A | A | A |
| Example 2-3 | Corona | Cerium Oxide | 6.0 | 6.0 | 6.0 | A | A | A |
| Example 2-4 | Corona | Cerium Oxide | 6.0 | 6.0 | 6.0 | A | A | A |
| Example 2-5 | Easy Adhesion | Cerium Oxide | 6.5 | 6.5 | 6.5 | A | A | A |
| Example 2-6 | Corona | Cerium Oxide | 6.0 | 6.0 | 6.0 | A | A | A |
| Example 2-7 | Corona | Cerium Oxide | 6.0 | 6.0 | 6.0 | A | A | A |
| Example 2-8 | Corona | Cerium Oxide | 6.0 | 6.0 | 6.0 | A | A | A |
| Example 2-9 | Corona | Chromate | 6.0 | 6.0 | 6.0 | B | A | A |
| Comparative Example 2-1 | Corona | Cerium Oxide | 6.0 | 6.0 | 4.5 | A | A | A |
| Comparative Example 2-2 | Corona | Cerium Oxide | 6.0 | 6.0 | 4.5 | A | A | A |
| Comparative Example 2-3 | Corona | Cerium Oxide | 4.5 | 4.0 | 4.0 | — | — | — |
| Comparative Example 2-4 | Corona | Cerium Oxide | 4.0 | 3.5 | 3.5 | — | — | — |
| Comparative Example 2-5 | Corona | Cerium Oxide | 4.5 | 4.0 | 4.0 | — | — | — |

<Evaluation of Adhesion>

For the packaging materials 10 for a power storage device of heat lamination structure (160° C.) produced in Examples and Comparative Examples, adhesion between the substrate layer 11 and the metal foil layer 14 was evaluated using the following method. First, each packaging material 10 for a power storage device was arranged in a forming apparatus, with the sealant layer 17 facing upward. The forming depth of the forming apparatus was set to 5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD).

As will be understood from the results shown in Table 4, according to the Examples of the present invention, good deep drawing formability can be provided regardless of production process of the packaging material. It will be further understood that, to obtain better adhesion regardless of production process of the packaging material, the metal foil layer is preferably surface-treated using cerium oxide.

Third Arrangement

Experiment 1

In Experiment 1, a packaging material 10 for a power storage device with a configuration shown in Table 5 was produced. Specifically, as the metal foil layer 14, soft aluminum foil 8079 having a thickness from 25 to 35 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and successively baked to form the anticorrosion treatment layer 15a on a surface of the metal foil treatment 14 and the anticorrosion treatment layer 15b on the other surface. The sol was baked at a temperature of 150° C. and for a treatment time of 30 seconds.

Then, corona treatment was applied to a surface of a copolyester film, as the substrate layer 11, with a thickness from 6 to 25 μm produced by a biaxial stretch method.

Then, a polyurethane-based adhesive was applied, as the adhesive layer 13, to a surface of the anticorrosion treatment layer 15a of the metal foil layer 14, on a side opposite of the metal foil layer 14. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in an atmospheric air at 60° C. temperature for 6 days for aging treatment.

Then, the sealant adhesive layer 16 was formed on a surface of the anticorrosion treatment layer 15b on a side opposite of the metal foil layer 14. The sealant adhesive layer 16 was formed by extruding maleic anhydride modified polypropylene (Trade name: ADMER, manufactured by Mitsui Chemicals, Inc.) serving as a base material of the sealant adhesive layer 16. The sealant adhesive layer 16 was ensured to have a thickness of 20 μm. Then, a polyolefin film with a thickness in the range of 25 to 80 μm (non-stretched polypropylene film having a sealant adhesive layer 16 side corona-treated surface) serving as the sealant layer 17 was adhered (heat-pressure bonded) to the anticorrosion treatment layer 15b at 180° C. via the sealant adhesive layer 16 by sandwich lamination. A packaging material 10 for a power storage device was thus produced.

TABLE 5

| Substrate Layer Thickness (μm) | Metal Foil Layer Thickness (μm) | Substrate Layer Thickness/Metal Foil Layer Thickness | Sealant Layer Thickness | | |
|---|---|---|---|---|---|
| | | | 25 μm | 45 μm | 80 μm |
| 6 | 25 | 0.24 | Comparative Example 3-1 | Comparative Example 3-2 | Comparative Example 3-3 |
| 9 | 25 | 0.36 | Example 3-1 | Example 3-2 | Example 3-3 |
| 12 | 25 | 0.48 | Example 3-4 | Example 3-5 | Example 3-6 |
| 16 | 25 | 0.64 | Example 3-7 | Example 3-8 | Example 3-9 |
| 25 | 25 | 1.00 | Example 3-10 | Example 3-11 | Example 3-12 |
| 6 | 30 | 0.20 | Comparative Example 3-4 | Comparative Example 3-5 | Comparative Example 3-6 |
| 9 | 30 | 0.30 | Example 3-13 | Example 3-14 | Example 3-15 |
| 12 | 30 | 0.40 | Example 3-16 | Example 3-17 | Example 3-18 |
| 16 | 30 | 0.53 | Example 3-19 | Example 3-20 | Example 3-21 |
| 25 | 30 | 0.83 | Example 3-22 | Example 3-23 | Example 3-24 |
| 6 | 35 | 0.17 | Comparative Example 3-7 | Comparative Example 3-8 | Comparative Example 3-9 |
| 9 | 35 | 0.26 | Example 3-25 | Example 3-26 | Example 3-27 |
| 12 | 35 | 0.34 | Example 3-28 | Example 3-29 | Example 3-30 |
| 16 | 35 | 0.46 | Example 3-31 | Example 3-32 | Example 3-33 |
| 25 | 35 | 0.71 | Example 3-34 | Example 3-35 | Example 3-36 |

* Substrate layer: PET, Metal foil layer: Al, Sealant layer: PP

<Evaluation on Drawing Depth>

For the packaging materials 10 for a power storage device produced in Examples and Comparative Examples, drawing depth of deep drawing was evaluated by the following method. First, each packaging material 10 for a power storage device was arranged in a forming apparatus, with the sealant layer 17 facing upward. Forming depth of the forming apparatus was set to a ratio of 1.0 to 4.0 mm per 0.25 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material 10 with light to thereby obtain the maximum value of the drawing depth with which the packaging material was deep-drawn causing neither breakage nor pinholes. The results are shown in Table 6.

TABLE 6

| | Drawing Depth (mm) | | | | |
|---|---|---|---|---|---|
| Comparative Example 3-1 | 1.50 | Comparative Example 3-2 | 1.25 | Comparative Example 3-3 | 1.25 |
| Example 3-1 | 2.25 | Example 3-2 | 2.00 | Example 3-3 | 2.00 |
| Example 3-4 | 2.25 | Example 3-5 | 2.00 | Example 3-6 | 2.00 |
| Example 3-7 | 3.00 | Example 3-8 | 2.75 | Example 3-9 | 2.50 |
| Example 3-10 | 3.25 | Example 3-11 | 3.00 | Example 3-12 | 2.75 |

TABLE 6-continued

| | Drawing Depth (mm) | | | | |
|---|---|---|---|---|---|
| Comparative Example 3-4 | 1.75 | Comparative Example 3-5 | 1.75 | Comparative Example 3-6 | 1.50 |
| Example 3-13 | 2.75 | Example 3-14 | 2.50 | Example 3-15 | 2.25 |
| Example 3-16 | 2.75 | Example 3-17 | 2.50 | Example 3-18 | 2.25 |
| Example 3-19 | 3.25 | Example 3-20 | 3.00 | Example 3-21 | 2.75 |
| Example 3-22 | 3.50 | Example 3-23 | 3.25 | Example 3-24 | 3.00 |
| Comparative Example 3-7 | 1.75 | Comparative Example 3-8 | 1.75 | Comparative Example 3-9 | 1.50 |
| Example 3-25 | 2.75 | Example 3-26 | 2.50 | Example 3-27 | 2.25 |
| Example 3-28 | 2.75 | Example 3-29 | 2.50 | Example 3-30 | 2.25 |
| Example 3-31 | 3.75 | Example 3-32 | 3.50 | Example 3-33 | 3.25 |
| Example 3-34 | 4.00 | Example 3-35 | 3.75 | Example 3-36 | 3.50 |

It will be understood from these results that the packaging materials 10 for a power storage device of Examples can exhibit good deep drawing formability.

<Curling Evaluation>

For the packaging materials 10 for a power storage device of the above Examples resulted in favorable drawing depth were evaluated as to curling after being formed. Specifically, first, each packaging material 10 for a power storage device was arranged in a forming apparatus, with the sealant layer 17 facing upward. The forming depth of the forming apparatus was set to 2.0 mm and the packaging material was cold-formed in an environment of 23° C. room temperature and −35° C. dew point temperature. The punch die used had a rectangular transverse cross-section of 69 mm×50 mm, a bottom with 1.00 mm punch radius (RP), and a side face with 1.00 mm punch corner radius (RCP). The die used had an opening top with 1.00 mm die radius (RD). After that, curling (warpage, rounding) was evaluated based on the following criteria, for four corners excepting the cold-formed area. The results are shown in Table 7.

A: No warpage (rounding) of 90° or more was observed in any of the 4 corners.

B: Warpage (rounding) of 90° or more was observed in not more than 3 corners.

C: Warpage (rounding) of 90° or more was observed in all the 4 corners.

TABLE 7

| Curling Evaluation | | | | | | | | |
|---|---|---|---|---|---|---|---|---|
| | Substrate Layer Thickness/ Sealant Layer Thickness | | | Substrate Layer Thickness/ Sealant Layer Thickness | | | Substrate Layer Thickness/ Sealant Layer Thickness | |
| Comparative Example 3-1 | — | | Comparative Example 3-2 | — | | Comparative Example 3-3 | — | |
| Example 3-1 | 0.36 | B | Example 3-2 | 0.20 | A | Example 3-3 | 0.11 | A |
| Example 3-4 | 0.48 | C | Example 3-5 | 0.27 | A | Example 3-6 | 0.15 | A |
| Example 3-7 | 0.64 | C | Example 3-8 | 0.36 | B | Example 3-9 | 0.20 | A |
| Example 3-10 | 1.00 | C | Example 3-11 | 0.56 | C | Example 3-12 | 0.31 | A |
| Comparative Example 3-4 | — | | Comparative Example 3-5 | — | | Comparative Example 3-6 | — | |
| Example 3-13 | 0.36 | B | Example 3-14 | 0.20 | A | Example 3-15 | 0.11 | A |
| Example 3-16 | 0.48 | C | Example 3-17 | 0.27 | A | Example 3-18 | 0.15 | A |
| Example 3-19 | 0.64 | C | Example 3-20 | 0.36 | B | Example 3-21 | 0.20 | A |
| Example 3-22 | 1.00 | C | Example 3-23 | 0.56 | C | Example 3-24 | 0.31 | A |
| Comparative Example 3-7 | — | | Comparative Example 3-8 | — | | Comparative Example 3-9 | — | |
| Example 3-25 | 0.36 | B | Example 3-26 | 0.20 | A | Example 3-27 | 0.11 | A |
| Example 3-28 | 0.48 | C | Example 3-29 | 0.27 | A | Example 3-30 | 0.15 | A |
| Example 3-31 | 0.64 | C | Example 3-32 | 0.36 | B | Example 3-33 | 0.20 | A |
| Example 3-34 | 1.00 | C | Example 3-35 | 0.56 | C | Example 3-36 | 0.31 | A |

It will be understood from these results that, in the packaging materials 10 for a power storage device of Examples, particularly those which have a predetermined thickness ratio of substrate layer/sealant layer, can sufficiently reduce curling after forming of the packaging material, in addition to exhibiting good deep drawing formability.

<Evaluation of Adhesion>

For the packaging materials 10 for a power storage device produced in Examples and Comparative Examples, adhesion between the substrate layer 11 and the metal foil layer 14 was evaluated using the following method. First, each packaging material 10 for a power storage device was arranged in a forming apparatus, with the sealant layer 17 facing upward. The forming depth of the forming apparatus was set to 5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD).

Then, the cold-formed packaging material 10 was placed in a 100 mL capacity beaker containing 30 mL of 1 M lithium hexafluorophosphate solution (solvent volume ratio=ethyl carbonate:dimethyl carbonate:dimethyl carbonate=1:1:1). Then, the beaker containing the packaging material 10 was sealed in an 18 L can and left standing in an environment of 40° C. temperature for 2 hours to expose the packaging material 10 to the electrolyte. After that, the packaging material 10 was taken out of the beaker in the 18 L can and placed in a 110° C. oven, or in an environment of 60° C. temperature and 95% humidity, or in 50° C. hot water. Then, the presence/absence of separation between the substrate layer 11 and the metal foil layer 14 of the packaging material 10 was visually checked after 1, 2, 3, 4 and 9 weeks to thereby obtain the maximum value (unit: week) of the period during which no separation was observed between the substrate layer 11 and the metal foil layer 14. Based on the results, adhesion between the substrate layer 11 and the metal foil layer 14 was evaluated according to the following evaluation criteria. If the evaluation is B or higher, adhesion between the substrate layer 11 and the metal foil layer 14 may be taken to be good.

A: No separation was observed after 9 weeks.
B: No separation was observed after 4 weeks but observed after 9 weeks.

In Experiment 1, Examples and Comparative Examples were evaluated as A in any condition.

Experiment 2

In Experiment 2, a packaging material 10 for a power storage device of a configuration shown in Table 8 was prepared in the same manner as in Experiment 1 except that the adhesion enhancement layer 12 was formed on the adhesive layer 13 side surface of the substrate layer 11 instead of corona-treating the surface of the substrate layer 11. A coating agent serving as a base material of the adhesion enhancement layer 12 was applied to a surface of the substrate layer 11 by in-line coating so as to have a solid content of 0.1 g/m², followed by drying, thereby forming an adhesion enhancement layer 12 with a thickness of approximately 0.1 μm. The coating agent prepared as follows was used.

(Preparation of Coating Agent for Forming Adhesion Enhancement Layer)

The coating agent for forming an adhesion enhancement layer was prepared with the following formulation.

Coating agent: Self-emulsifying polyisocyanate "Aquanate 100", manufactured by Nippon Polyurethane Industry Co., Ltd., and spherical silica microparticles "Seahostar KE-P30" (average particle size of 0.3 μm), manufactured by Nippon Shokubai Co., Ltd., were added to a water-soluble polyester "Aron Melt PES-1000", manufactured by Toagosei Co., Ltd., at a formulation ratio (mass ratio) of 95/5/0.5 and diluted with water.

TABLE 8

| Layer Configuration | | | | | |
|---|---|---|---|---|---|
| Substrate Layer Thickness (μm) | Metal Foil Layer Thickness (μm) | Substrate Layer Thickness/Metal Foil Layer Thickness | Sealant Layer Thickness | | |
| | | | 25 μm | 45 μm | 80 μm |
| 12 | 25 | 0.48 | Example 3-37 | Example 3-38 | Example 3-39 |
| 12 | 30 | 0.40 | Example 3-40 | Example 3-41 | Example 3-42 |
| 12 | 35 | 0.34 | Example 3-43 | Example 3-44 | Example 3-45 |

<Evaluations>

Drawing depth, curling, and adhesion were evaluated in a manner similar to Experiment 1. The results are shown in Tables 9 and 10. In the Examples, adhesion was evaluated as A in any condition.

TABLE 9

| Drawing Depth (mm) | | | | | |
|---|---|---|---|---|---|
| Example 3-37 | 2.75 | Example 3-38 | 2.50 | Example 3-39 | 2.50 |
| Example 3-40 | 3.25 | Example 3-41 | 3.00 | Example 3-42 | 2.75 |
| Example 3-43 | 3.25 | Example 3-44 | 3.00 | Example 3-45 | 2.75 |

TABLE 10

| Curling Evaluation | | | | | | | | |
|---|---|---|---|---|---|---|---|---|
| | Substrate Layer Thickness/Sealant Layer Thickness | | | Substrate Layer Thickness/Sealant Layer Thickness | | | Substrate Layer Thickness/Sealant Layer Thickness | |
| Example 3-37 | 0.48 | C | Example 3-38 | 0.27 | A | Example 3-39 | 0.15 | A |
| Example 3-40 | 0.48 | C | Example 3-41 | 0.27 | A | Example 3-42 | 0.15 | A |
| Example 3-43 | 0.48 | C | Example 3-44 | 0.27 | A | Example 3-45 | 0.15 | A |

As will be understood from these results, more favorable drawing depth is obtained when the adhesion enhancement layer 12 is provided instead of corona-treating a surface of the substrate layer 11.

Experiment 3

In Experiment 3, the anticorrosion treatment layers 15a and 15b were formed by applying a treatment liquid containing a phenolic resin, a chromium fluoride compound, and phosphoric acid onto both surfaces of the metal foil layer 14 for formation of a coating, followed by baking for chromate treatment, instead of forming them using a sodium polyphosphate-stabilized cerium oxide sol. Except for the above, a packaging material 10 for a power storage device with a configuration shown in Table 11 was produced in the same manner as in Example 3-1.

TABLE 11

| Substrate Layer Thickness (μm) | Metal Foil Layer Thickness (μm) | Substrate Layer Thickness/Metal Foil Layer Thickness | Sealant Layer Thickness | | |
|---|---|---|---|---|---|
| | | | 25 μm | 45 μm | 80 μm |
| 12 | 25 | 0.48 | Example 3-46 | Example 3-47 | Example 3-48 |
| 12 | 30 | 0.40 | Example 3-49 | Example 3-50 | Example 3-51 |
| 12 | 35 | 0.34 | Example 3-52 | Example 3-53 | Example 3-54 |

<Evaluations>

Drawing depth, curling, and adhesion were evaluated in a manner similar to Experiment 1. The results are shown in Tables 12, 13 and 14.

TABLE 12

Drawing Depth (mm)

| | | | | | |
|---|---|---|---|---|---|
| Example 3-46 | 2.25 | Example 3-47 | 2.00 | Example 3-48 | 2.00 |
| Example 3-49 | 2.75 | Example 3-50 | 2.50 | Example 3-51 | 2.25 |
| Example 3-52 | 2.75 | Example 3-53 | 2.50 | Example 3-54 | 2.25 |

TABLE 13

Curling Evaluation

| | Substrate Layer Thickness/Sealant Layer Thickness | | | Substrate Layer Thickness/Sealant Layer Thickness | | | Substrate Layer Thickness/Sealant Layer Thickness | |
|---|---|---|---|---|---|---|---|---|
| Example 3-46 | 0.48 | C | Example 3-47 | 0.27 | A | Example 3-48 | 0.15 | A |
| Example 3-49 | 0.48 | C | Example 3-50 | 0.27 | A | Example 3-51 | 0.15 | A |
| Example 3-52 | 0.48 | C | Example 3-53 | 0.27 | A | Example 3-54 | 0.15 | A |

TABLE 14

Adhesion Evaluation

| | 110° C. | 65° C. 95% | 50° C. Hot Water |
|---|---|---|---|
| Examples 3-46 to 3-48 | B | A | A |
| Examples 3-49 to 3-51 | B | A | A |
| Examples 3-52 to 3-54 | B | A | A |

As will be understood from these results, adhesion in some conditions was evaluated to be slightly worse when the anticorrosion treatment layers were formed through chromate treatment, instead of the treatment using a sodium polyphosphate stabilized cerium oxide sol.

REFERENCE SIGNS LIST

1 . . . Battery element; 2 . . . Lead; 10 . . . Packaging material (packaging material for power storage device); 11 . . . Substrate layer; 12 . . . Adhesion enhancement layer; 13 . . . Adhesive layer; 14 . . . Metal foil layer; 15a, 15b . . . Anticorrosion treatment layer; 16 . . . Sealant adhesive layer; 17 . . . Sealant layer; 18 . . . Coating layer; 30 . . . Embossed packaging material; 32 . . . Shaped area (recess); 34 . . . Cover portion; 40 . . . Secondary battery.

What is claimed is:

1. A packaging material for a power storage device comprising:
    a structure including a substrate layer, an adhesive layer, a metal foil layer, a sealant adhesive layer, and a sealant layer laminated in this order,
    wherein the substrate layer comprises a polyester film having a 50% elongation stress in a range of 100 to 180 MPa and a thermal shrinkage in a range of 1% to 15%, after heat treatment in a range of 160° C. to 200° C.;
    wherein the 50% elongation stress is an average of stresses resulting from tensile tests (test piece shape: dumbbell No. 5 according to JIS K7127; length between chucks: 75 mm; gauge length: 25 mm; test speed: 50 mm/min; temperature: 23° C.) in four directions (0° (MD), 45°, 90° (TD), 135°) of the substrate layer; and
    wherein the thermal shrinkage is an average of shrinkages before and after heat treatment in four directions (0° (MD), 45°, 90° (TD), 135°) of the substrate layer.

2. A packaging material for a power storage device comprising:
    a structure including a substrate layer, an adhesive layer, a metal foil layer, a sealant adhesive layer, and a sealant layer laminated in this order,
    wherein the substrate layer comprises a polyester film having ΔA of 12% or more expressed by Formula (1) below and having a 50% elongation stress of 75 MPa or more after heat treatment at 200° C.:

ΔA=(break elongation after 200° C. heat treatment)−(break elongation after 160° C. heat treatment)   (Formula (1)), and, wherein the break elongation and the 50% elongation stress are each an average at 23° C. resulting from tensile tests (test piece shape: dumbbell No. 5 according to JIS K7127, length between chucks: 75 mm, gauge length: 25 mm, test speed: 50 mm/min) in four directions (0° (MD), 45°, 90° (TD), 135°) of the substrate layer.

3. The packaging material for a power storage device of claim 1, wherein the polyester film has a thermal shrinkage in a range of 1 to 5% after heat treatment at 160° C.

4. The packaging material for a power storage device of claim 1, further comprising an adhesion enhancement layer provided between the substrate layer and the adhesive layer.

5. The packaging material for a power storage device of claim 4, wherein the easy adhesion treatment contains at least one resin selected from a group consisting of a polyester resin, an acrylic resin, a polyurethane resin, an epoxy resin, and an acrylic-grafted polyester resin.

6. The packaging material for a power storage device of claim 1, further comprising an anticorrosion treatment layer on both surfaces of the metal foil layer.

7. The packaging material for a power storage device of claim 6, wherein the anticorrosion treatment layer contains a rare earth element oxide, and phosphoric acid or phosphate.

8. The packaging material for a power storage device of claim 7, wherein the rare earth element oxide is cerium oxide.

9. The packaging material for a power storage device of claim 1, wherein the structure further includes a coating layer laminated on the substrate layer.

10. The packaging material for a power storage device of claim 9, wherein the coating layer contains at least one resin selected from a group consisting of an acrylic resin and a polyester resin.

11. The packaging material for a power storage device of claim 9, wherein the coating layer has a thickness in a range of 0.05 to 3 μm.

12. The packaging material for a power storage device of claim 1, wherein a thickness ratio of the substrate layer to the metal foil layer (substrate layer thickness/metal foil layer thickness) is in a range of 0.25 to 1.00.

* * * * *